United States Patent
Yamauchi

(10) Patent No.: US 6,614,939 B1
(45) Date of Patent: *Sep. 2, 2003

(54) IMAGE COMPRESSION APPARATUS AND DECODING APPARATUS SUITED TO LOSSLESS IMAGE COMPRESSION

(75) Inventor: Masaki Yamauchi, Moriguchi (JP)

(73) Assignee: Matsushita Electric Industrial Co., LTD, Osaka-fu (JP)

( * ) Notice: Subject to any disclaimer, the term of this patent is extended or adjusted under 35 U.S.C. 154(b) by 0 days.

(21) Appl. No.: 09/129,456

(22) Filed: Aug. 4, 1998

(30) Foreign Application Priority Data

Aug. 5, 1997 (JP) .............................................. 9-210264

(51) Int. Cl.$^7$ .............................. G06K 9/36; G06K 9/46
(52) U.S. Cl. ........................ 382/240; 382/233; 382/244; 382/173
(58) Field of Search ................................ 382/173, 180, 382/266, 233, 237, 240, 244, 232

(56) References Cited

U.S. PATENT DOCUMENTS 5,303,313 A * 4/1994 Mark et al. .................. 382/235
5,805,098 A * 9/1998 McCorkle .................... 342/25

OTHER PUBLICATIONS

"A Segmentation–Based Lossless Image Coding Method for High–Resolution Medical Image Compression," by L. Shen et al., IEEE Transactions on Medical Imaging, vol. 16, No. 3, Jun. 1997.

"Image Compression via Improved Quadtree Decomposition Algorithms," by E. Shusterman et al., IEEE Transactions on Image Processing, Vo. 3, No. 2, Mar. 1994.

* cited by examiner

Primary Examiner—Phuoc Tran

(57) ABSTRACT

An image compression apparatus for outputting compressed image information that is suited to progressive image reproduction where completely lossless reproduction is possible without having to use large amounts of compressed image information. A decoding apparatus decodes the compressed image information and performs reproduction. The image compression apparatus performs image compression with a first segmentation for a first plane set that includes at one bit plane in block image information in the original image information. As a result, first region information composed of segmentation information showing a first segmentation result and luminance information is produced. The image compression apparatus also performs image compression with a second segmentation for a second plane set that includes at least one bit plane adjacent to the first plane set. Here, the first segmentation result is used as a standard. As a result, second region information composed of segmentation information and luminance information is produced. Compressed image information is then generated and outputted based on the first and second region information.

21 Claims, 21 Drawing Sheets

ORIGINAL IMAGE DATA TABLE

| PIXEL CODE | LUMINANCE BIT VALUES |
|---|---|
| (1, 1) | $f_1$ $f_2$ $f_3$ $f_4$ |
| (1, 2) | $f_1$ $f_2$ $f_3$ $f_4$ |
| (1, 3) | $f_1$ $f_2$ $f_3$ $f_4$ |
| ⋮ | ⋮ |
| (4, 4) | $f_1$ $f_2$ $f_3$ $f_4$ |

16 SETS

FIG. 6A
MSB DATA TABLE

| PIXEL CODE | LUMINANCE BIT VALUES |
|---|---|
| (1, 1) | f1 |
| (1, 2) | f1 |
| (1, 3) | f1 |
| ⋮ | ⋮ |
| (4, 4) | f1 |

FIG. 6B
2ND MSB DATA TABLE

| PIXEL CODE | LUMINANCE BIT VALUES |
|---|---|
| (1, 1) | f2 |
| (1, 2) | f2 |
| (1, 3) | f2 |
| ⋮ | ⋮ |
| (4, 4) | f2 |

FIG. 6C
2ND LSB DATA TABLE

| PIXEL CODE | LUMINANCE BIT VALUES |
|---|---|
| (1, 1) | f3 |
| (1, 2) | f3 |
| (1, 3) | f3 |
| ⋮ | ⋮ |
| (4, 4) | f3 |

FIG. 6D
LSB DATA TABLE

| PIXEL CODE | LUMINANCE BIT VALUES |
|---|---|
| (1, 1) | f4 |
| (1, 2) | f4 |
| (1, 3) | f4 |
| ⋮ | ⋮ |
| (4, 4) | f4 |

FIG. 6E

| PIXEL CODE | LUMINANCE BIT VALUES |
|---|---|
| (1, 1) | f1  f2 |
| (1, 2) | f1  f2 |
| (1, 3) | f1  f2 |
| ⋮ | ⋮ |
| (4, 4) | f1  f2 |

FIG. 6F

| PIXEL CODE | LUMINANCE BIT VALUES |
|---|---|
| (1, 1) | f1  f2  f3 |
| (1, 2) | f1  f2  f3 |
| (1, 3) | f1  f2  f3 |
| ⋮ | ⋮ |
| (4, 4) | f1  f2  f3 |

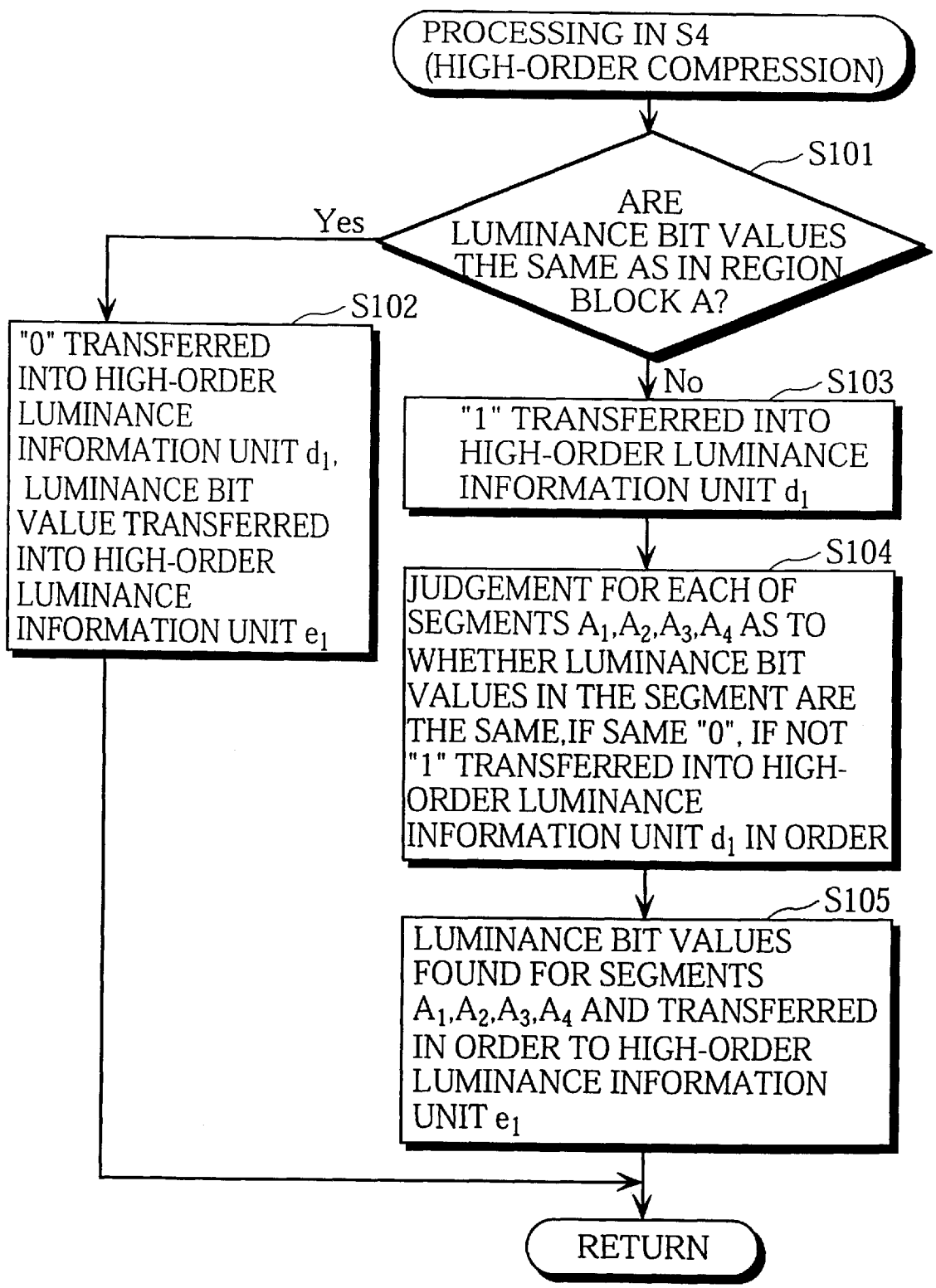

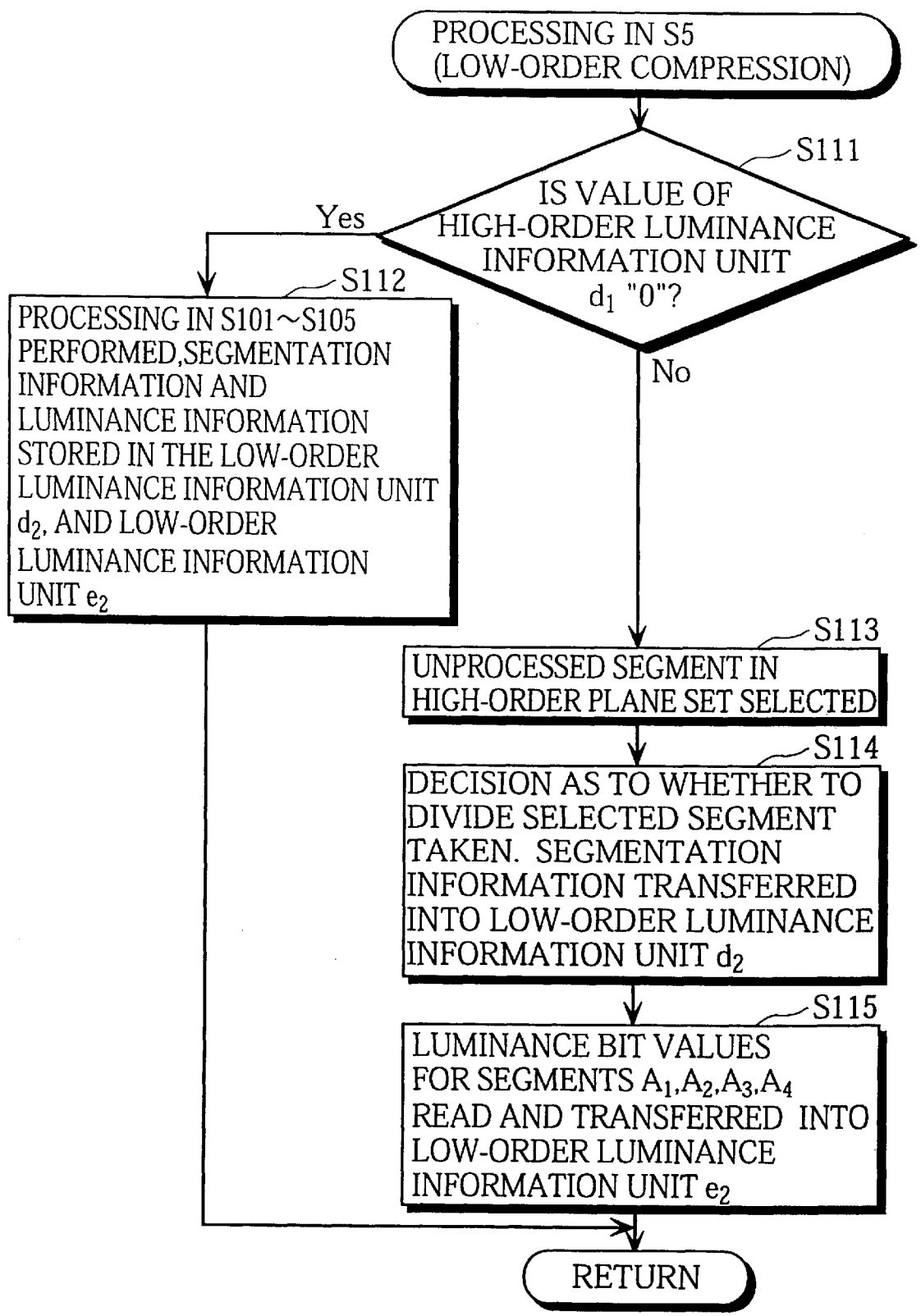

WHEN SEGMENTATION INFORMATION IS PRESENT

WHEN SEGMENTATION INFORMATION IS NOT PRESENT

FIG. 15

SEGMENTATION FOR MSB PLANE

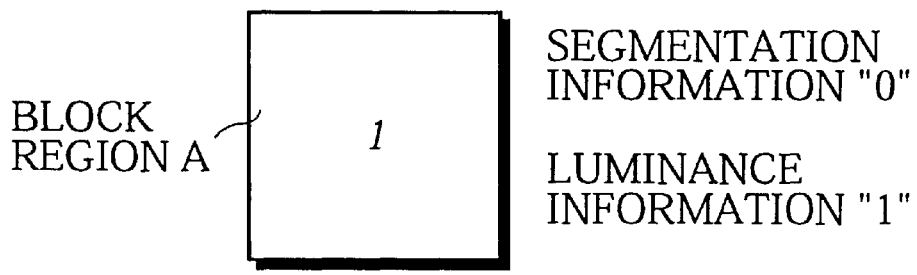

BLOCK REGION A — 1

SEGMENTATION INFORMATION "0"

LUMINANCE INFORMATION "1"

SEGMENTATION FOR 2ND MSB PLANE

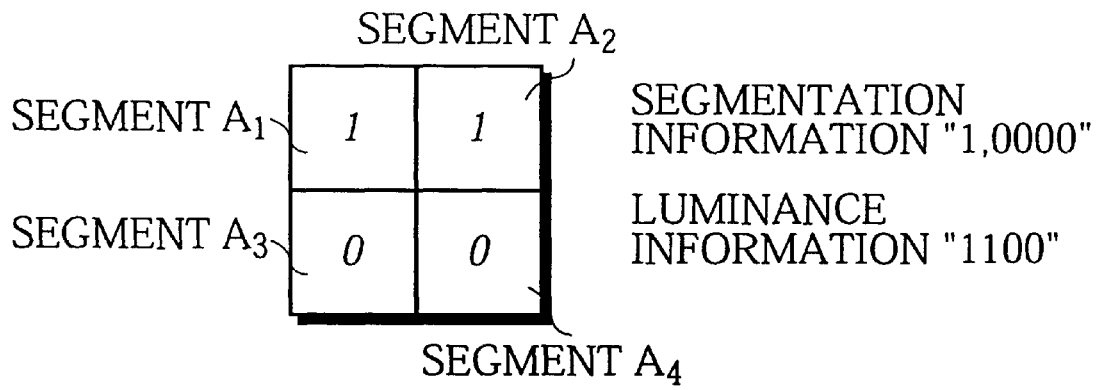

SEGMENT $A_2$
SEGMENT $A_1$
SEGMENT $A_3$
SEGMENT $A_4$

SEGMENTATION INFORMATION "1,0000"

LUMINANCE INFORMATION "1100"

BITSTREAM FOR COMPRESSED IMAGE DATA

START  {0,1,10000,1100}

SEGMENTATION INFORMATION
 {"0","1,0000"} = 6 bits

LUMINANCE INFORMATION
 5 segments × 1 bits/segments = 5 bits

} TOTAL 11 bits

FIG. 16

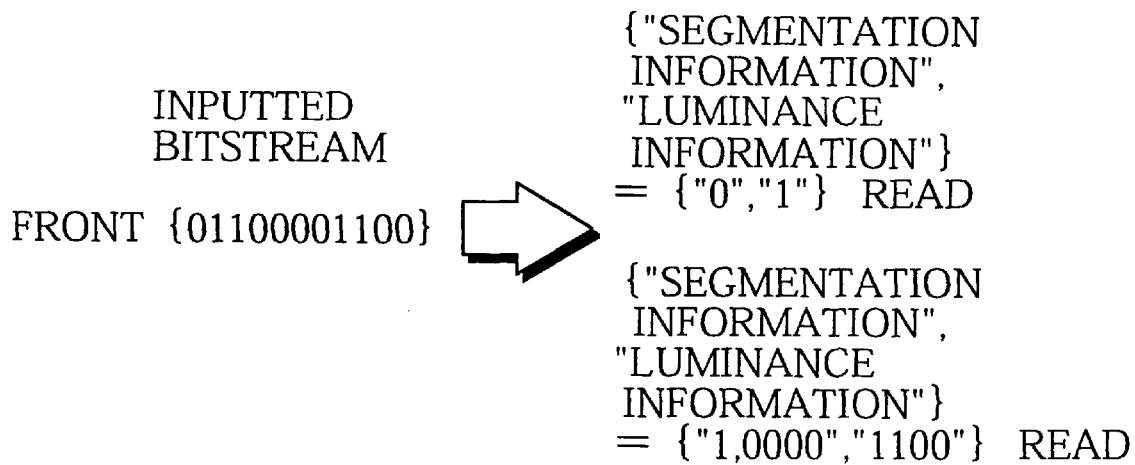

INPUTTED BITSTREAM

FRONT {01100001100}

{"SEGMENTATION INFORMATION", "LUMINANCE INFORMATION"} = {"0","1"} READ

{"SEGMENTATION INFORMATION", "LUMINANCE INFORMATION"} = {"1,0000","1100"} READ

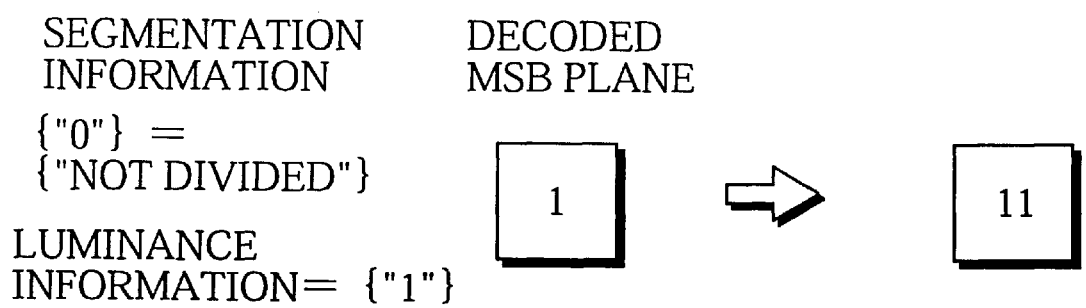

SEGMENTATION INFORMATION

{"0"} = {"NOT DIVIDED"}

LUMINANCE INFORMATION= {"1"}

DECODED MSB PLANE

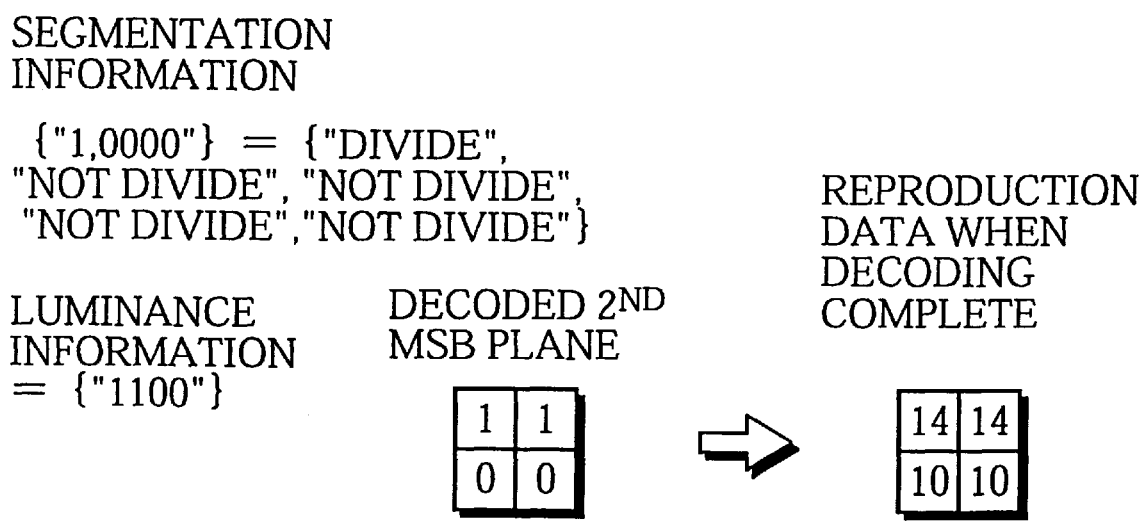

SEGMENTATION INFORMATION

{"1,0000"} = {"DIVIDE", "NOT DIVIDE", "NOT DIVIDE", "NOT DIVIDE","NOT DIVIDE"}

LUMINANCE INFORMATION = {"1100"}

DECODED 2$^{ND}$ MSB PLANE

REPRODUCTION DATA WHEN DECODING COMPLETE

WHEN SEGMENTATION INFORMATION
IS PRESENT

START　　　　　　　　　　　　　　　　　　　END

WHEN SEGMENTATION INFORMATION
IS NOT PRESENT

START　　　　　　　　　　　　　　　　　　　END

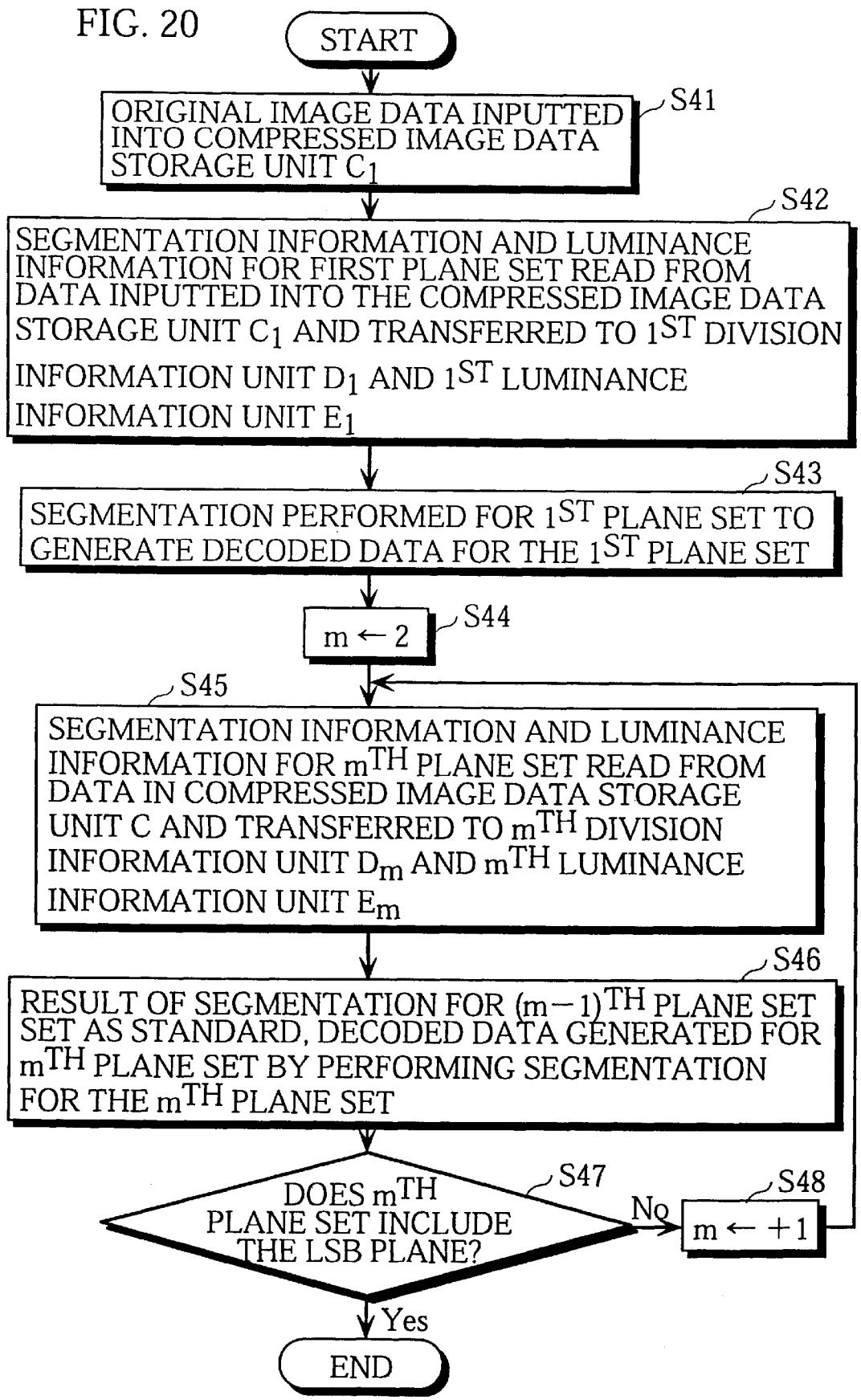

FIG. 21

MSB BIT PLANE

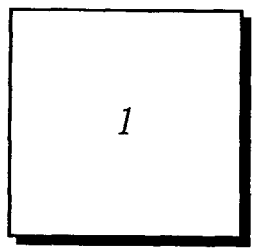

SEGMENTATION INFORMATION "0"

LUMINANCE INFORMATION "1"

2$^{ND}$ MSB BIT PLANE

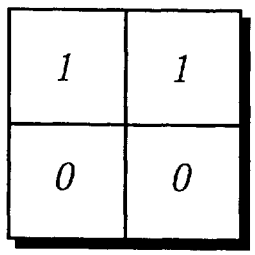

SEGMENTATION INFORMATION "1,0000"

LUMINANCE INFORMATION "1100"

2$^{ND}$ LSB BIT PLANE

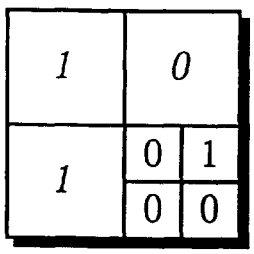

SEGMENTATION INFORMATION "0001"

LUMINANCE INFORMATION "101,0100"

LSB BIT PLANE

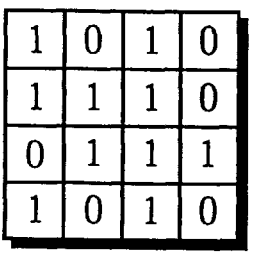

SEGMENTATION INFORMATION "111"

LUMINANCE INFORMATION "1011 1010 0110 1110"

SEGMENTATION INFORMATION
{"0","1,0000","0001","111"} =13 bits
LUMINANCE INFORMATION
28 segments × 1 bits/segments =28bits
TOTAL   41 bits

FIG. 22A

SEGMENTATION INFORMATION "0"

LUMINANCE INFORMATION "1"

MSB PLANE DECODED

| 1 |

REPRODUCTION DATA WHEN MSB PLANE DECODED

| 11 |

FIG. 22B

SEGMENTATION INFORMATION "1,0000"

LUMINANCE INFORMATION "1100"

2$^{ND}$ MSB PLANE DECODED

| 1 | 1 |
| 0 | 0 |

REPRODUCTION DATA WHEN 2$^{ND}$ MSB PLANE DECODED

| 14 | 14 |
| 10 | 10 |

FIG. 22C

SEGMENTATION INFORMATION "0001"

LUMINANCE INFORMATION "101,0100"

2$^{ND}$ LSB PLANE DECODED

| 1 | 0 |
| 1 | 0 | 1 |
|   | 0 | 0 |

REPRODUCTION DATA WHEN 2$^{ND}$ LSB PLANE DECODED

| 14 | 12 |
| 10 | 8 | 10 |
|    | 8 | 8  |

FIG. 22D

SEGMENTATION INFORMATION "111"

LUMINANCE INFORMATION "1011,1010,0110,1110"

LSB PLANE DECODED

| 1 | 0 | 1 | 0 |
| 1 | 1 | 1 | 0 |
| 0 | 1 | 1 | 1 |
| 1 | 0 | 1 | 0 |

REPRODUCTION DATA WHEN DECODING COMPLETE

| 15 | 14 | 13 | 12 |
| 15 | 15 | 13 | 12 |
| 10 | 11 | 9  | 11 |
| 11 | 10 | 9  | 8  |

IMAGE COMPRESSION APPARATUS AND DECODING APPARATUS SUITED TO LOSSLESS IMAGE COMPRESSION

BACKGROUND OF THE INVENTION (1) Field of the Invention

The present invention relates to image compression encoding and decoding.

(2) Related Art

Advances in network technology and multimedia applications in recent years have created a greater need to handle large amounts of data, such as image files.

Image files generally include a large amount of data, and effectively need to be compressed before transmission. To address this need, image compression methods which use region division (hereinafter "segmentation") have been developed.

Image compression methods that use segmentation use a predetermined judgement standard (called a "division judgement condition") to divide image regions into segments.

As an example method of processing an image region, Image Coding by *Adaptive Tree-Structured Segmentation*, IEEE, Trans. Info., Vol.38, No.6, pp.1755–1767 (1992) teaches a method for dividing a region into convex polygons, while *Image Compression via Improved Quadtree Decomposition Algorithms*, IEEE Image. Proc., Vol.3, No.2, pp.207–215, (1994) teaches a method for quadtree division.

FIG. 1 is a representation of quadtree division.

As shown in FIG. 1, quadtree division uses a predetermined division judgement condition to judge whether a square region should be divided. On judging that division is necessary, this method divides the square region into four square subregions The method then repeats the judgement for the resulting subregions. In this way, the method generates subregions called "segments".

In the example shown in FIG. 1, the first division generates four segments. Of these, three segments are subjected to a second division. Of the segments produced by the second division, only segments that conform to the division judgement condition are subjected to a third division.

One conventional example of the division judgement condition uses the distribution of luminance values in the segment. Note that in this specification, "luminance" also includes the concept of "density". This method may judge whether a difference between the highest and lowest luminance values is within a given threshold, and has an advantage in that it uses little calculation. Another conventional method uses a calculated amount of error (such as the difference of squares) for when a mean value is used in place of every element in the segment. This second method has a different advantage, however, in that users can control the quality of the final reproduced image using the information-to-noise ratio when quadtree division is performed, the compressed image data is composed of segmentation information and luminance information. For the example shown in FIG. 1, the segmentation information is "1,1110,0011, 0010,0110", where "1" is the division code and "0" the no-division code. The luminance information, meanwhile, 1:1 corresponds to each segment when division is complete.

When using the quadtree division method, the greater the extent to which large regions are left undivided, the smaller the data size of the compressed image data, or in other words, the higher the compression rate.

In fields such as medicine, however, images need to be reproduced with a very high resolution to allow accurate representation of detail. As a result, there is a very strong demand in lossless or near-lossless image compression. Lossless compression refers to reversible compression where the pre-compression image will be faithfully reproduced after decoding with no loss of image quality.

One example of a reversible image compression technique that uses segmentation is taught by *MDL Genri to 2 Bunkikouzou Segumenteeshon wo Mochiita Gazou no Mubizumi Fugouka Arugorizumu* ("Image Encoding Algorithm that uses MDL Principles and a Dual-Tree Structure") published in Shin Gakuron (D-II), Vol.J80-D-II, No.2, pp.415–425, 1997).

When compressing an image using segmentation, there is the problem that improving the detail in the reproduction image inevitably results in division into segments of large areas in the original image where there are only minute differences in luminance values, or in other words, large areas may be regarded having a uniform luminance value. This significantly reduces the compression rate, and is major drawback for reversible (lossless) and quasi-reversible (near-lossless) compression.

The following is a description of the idea of "progressiveness".

Progressive reproduction refers to a process whereby a low-resolution image is initially displayed at the start of input or decoding of a bitstream, with the details of the image being slowed added as the input or decoding progresses. The reproduction image is finally displayed with the desired resolution.

This kind of reproduction can be highly effective, and is particularly valuable when searching through images, for example.

Compressed image data obtained through an image compression technique using segmentation where each segment has its own luminance value is unsuited to progressive reproduction. When such data is decoded, even if it were possible to produce the reproduction image in accordance with gradual changes in luminance values, it would still be difficult to perform progressive reproduction in accordance with the changes in resolution and in the shapes of segments.

In view of the stated problems, it is necessary to provide a decoding apparatus with a separate component to enable the progressive reproduction of image data that has been compressed in this way. In the third document cited above, progressive reproduction is realized by using a 2-path system where a differential image for differences between the original image and the resemblance image is encoded separately to the resemblance image.

SUMMARY OF THE INVENTION

It is an object of the present invention to provide an image compression apparatus that performs reversible compression without being limited to a low compression rate of data as in the conventional art. Such image compression apparatus generates compressed image information that is suited to progressive image reproduction. At the same time, the present invention aims to provide an image decoding apparatus that decodes compressed image data generated by this kind of image compression apparatus.

To achieve the stated object, the image compression apparatus of the present invention performs image compression using a first segmentation method on a first plane set that is composed of at least one consecutive bit plane in block image information in the original image information. By doing so, the image compression apparatus generates first region information composed of first segmentation information showing a segmentation result for a block, and first luminance information showing luminance information for each segment produced by the segmentation. The present image compression apparatus also performs image compression using a second segmentation method on a second plane set that is composed of at least one consecutive bit plane adjacent to the first plane set at a lower bit position in the block image information. By doing so, the image compression apparatus generates second region information composed of second segmentation information showing a segmentation result for the block, and second luminance information showing luminance information for each segment produced by the segmentation. The present image compression apparatus then generates compressed image information based on the first region information and second region information and outputs the compressed image information.

Note that the expression "bit plane" refers to a level (plane) composed of luminance bit values at a corresponding bit position in the luminance values.

The present image decoding apparatus reads first segmentation information and first luminance information from the inputted compressed image information, uses the first segmentation information to perform segmentation of the block according to a first segmentation method, and assigns the first luminance information to the segments produced by the segmentation to decode the first plane set.

The present image decoding apparatus also reads second segmentation information and second luminance information from the inputted compressed image information, uses the second segmentation information to perform segmentation of the block according to a second segmentation method, and assigns the second luminance information to the segments produced by the segmentation to decode the second plane set.

The image decoding apparatus then uses the decoding results of the first decoding unit and the second decoding unit to generate decoded image information.

With the image compression apparatus and the image decoding apparatus described above, segmentation is separately performed for the first plane set and the second plane set, so that even if there are variations in the luminance bit values in the second plane set but little variation in the luminance bit values in the first plane set, large decreases in the compression rate that conventionally occurred when performing reversible or quasi-reversible compression can be avoided.

The above construction has a particularly large effect when the luminance values in a block of original image data are almost uniform, so that there is little variation in luminance values.

The second plane set is decoded after first decoding the first plane set, so that progressive image reproduction can easily be achieved without requiring the addition of other components.

The result of segmentation of the block for the first plane set may be set as a standard when the image compression apparatus performs image compression according to the second segmentation method to generate the second segmentation information. The result of segmentation of the block for the first plane set may also be set as a standard when the image decoding apparatus performs segmentation of the block using the second segmentation information before assigning the second luminance information to the segments produced by the segmentation to decode the second plane set.

By operating in this way, the image compression apparatus and image decoding apparatus reflect the result of the segmentation of the first plane set in the segmentation performed for the second plane set. This can reduce the data amount of the second segmentation information, and so further increase the compression rate.

The stated first object can also be achieved by an image compression apparatus for producing compressed image information by compressing original image data that includes block image information, the block image information associating each pixel in a block composed of a plurality of pixels with a luminance value expressed using a natural number k of bits, where $k \geq 2$, the image compression apparatus: performing compression processing on a first plane set using a predetermined segmentation method, the first plane set being composed of at least one consecutive bit plane that includes a highest bit plane in the block image information in inputted original image data, to generate first region information composed of first segmentation information showing a segmentation of the block and first luminance information showing luminance bit values that each correspond to a different segment produced by the segmentation of the block; performing compression processing on an $n^{th}$ plane set using the predetermined segmentation method and a standard that is a result of a segmentation of blocks for an $(n-1)^{th}$ plane set in the block image information, the $n^{th}$ plane set being composed of at least one consecutive bit plane that is adjacent to the $(n-1)^{th}$ plane at a lower bit position in the block image information, to generate $n^{th}$ region information composed of $n^{th}$ segmentation information showing an $n^{th}$ segmentation of blocks and $n^{th}$ luminance information showing luminance bit values that each correspond to a different segment produced by the $n^{th}$ segmentation of the block, for each value of n from 2 to a predetermined number that is no greater than k; and generating and outputting compressed image information based on the first region information and the $n^{th}$ region information for every value of n from 2 to the predetermined number.

Corresponding to the above, an image decoding apparatus decodes the compressed image information generated by the image compression apparatus, the image decoding apparatus: reading the first segmentation information and the first luminance information from the inputted compressed image information; performing segmentation according to the predetermined segmentation method for blocks using the first segmentation information, and for decoding the first plane set by assigning the first luminance information to segments obtained as a result of the segmentation; repeating a process reading the $n^{th}$ segmentation information and the $n^{th}$ luminance information from the inputted compressed image information, for each value of n from n=2 to n=the predetermined number; performing segmentation according to the predetermined segmentation method for blocks using the read $n^{th}$ segmentation information with a result of segmentation for the $(n-1)^{th}$ plane set as a standard, and for decoding the $n^{th}$ plane set by assigning the $n^{th}$ luminance information to segments obtained as a result of the segmentation, in doing so decoding every plane set from n=2 to n=the predetermined number; and generating decoded image information based on a decoding result for the first plane set and decoding results for the $2^{nd}$ to the (predetermined number)$^{th}$ plane jets.

The above image compression apparatus and image decoding apparatus repeatedly perform a process where segmentation is performed for each plane set using the results of segmentation on upper plane sets. This increases the effects of the present invention.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIGS. 6A–6F show the data tables that the present embodiment uses;

FIG. 8 is a flowchart showing a specific example of the processing in step S4 of FIG. 7;

FIG. 9 is a flowchart showing a specific example of the processing in step S5 of FIG. 7;

FIG. 15 shows the image compression processing in the first accompanying embodiment;

FIG. 16 shows the decoding processing in the second accompanying embodiment;

FIG. 20 is a flowchart for the decoding processing in the fourth embodiment;

FIG. 21 shows the image compression processing in the third accompanying embodiment;

FIGS. 22A to 22D show the decoding processing in the fourth accompanying embodiment;

FIGS. 23A and 23B show the image compression and decoding processing in the second comparative example.

DESCRIPTION OF PREFERRED EMBODIMENTS

First Embodiment

Figure 1:
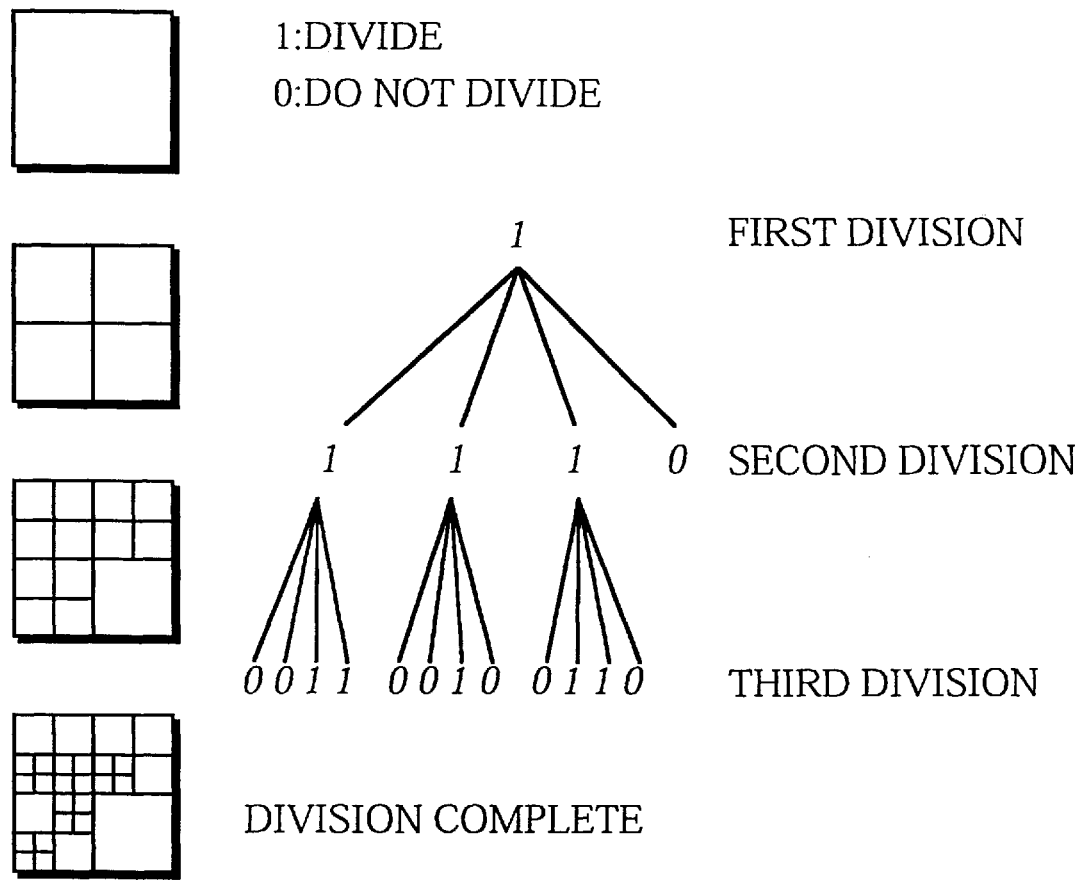
FIG. 1 is a representation of the quadtree division method.
Figure 2:
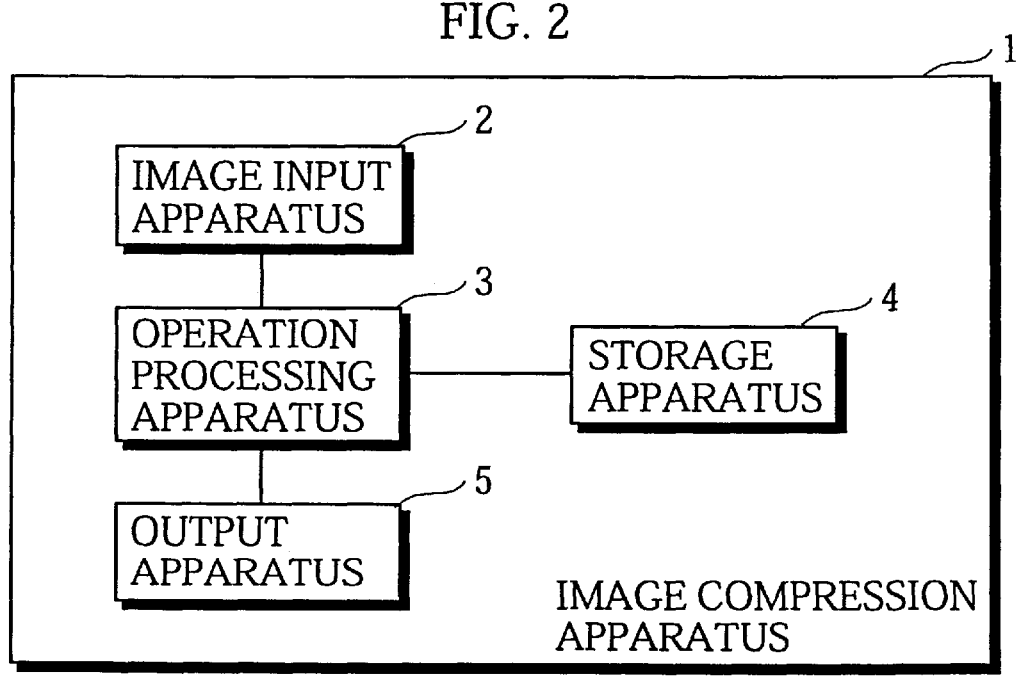
FIG. 2 shows a simplified construction of the image compression apparatus to which the first embodiment of the present invention relates.

FIG. 2 shows a simplified construction of the image compression apparatus in the first embodiment of the present invention.

The image compression apparatus 1 generates compressed image data by compressing original image data using quadtree segmentation for bit plane sets. This image compression apparatus 1 includes: an image input apparatus 2 for inputting the original image data; an operation processing apparatus 3 for performing operations such as segmentation on the inputted original image data; a storage apparatus 4 for storing the inputted original image data and data, such as segmentation information, generated by the image compression apparatus 1; and an output apparatus 5 for outputting the compressed image data generated by the operation processing apparatus 3 as a bitstream.

The settings described below are assumed for the present embodiment.

The inputted original image data is digital image data where each pixel that composes a frame is assigned a luminance value. In this example, each frame in the original image data is composed of 4*4 pixels, and the luminance value of each pixel in a frame is identified using a code.

In each frame, the highest bit of the luminance value of each pixel is the luminance bit value f1, the second bit is the luminance bit value f2, the third bit is the luminance bit value f3, and the fourth (lowest) bit is the luminance bit value f4. The value of each of the luminance bit values f1, f2, f3, and f4 is "0" or "1".

The entire frame of original image data is set as a block region for which the operation processing apparatus 3 performs image compression processing. Hereinafter, the frame that the operation processing apparatus 3 is currently processing will be referred to as the block region A.

Figures 3, 4:
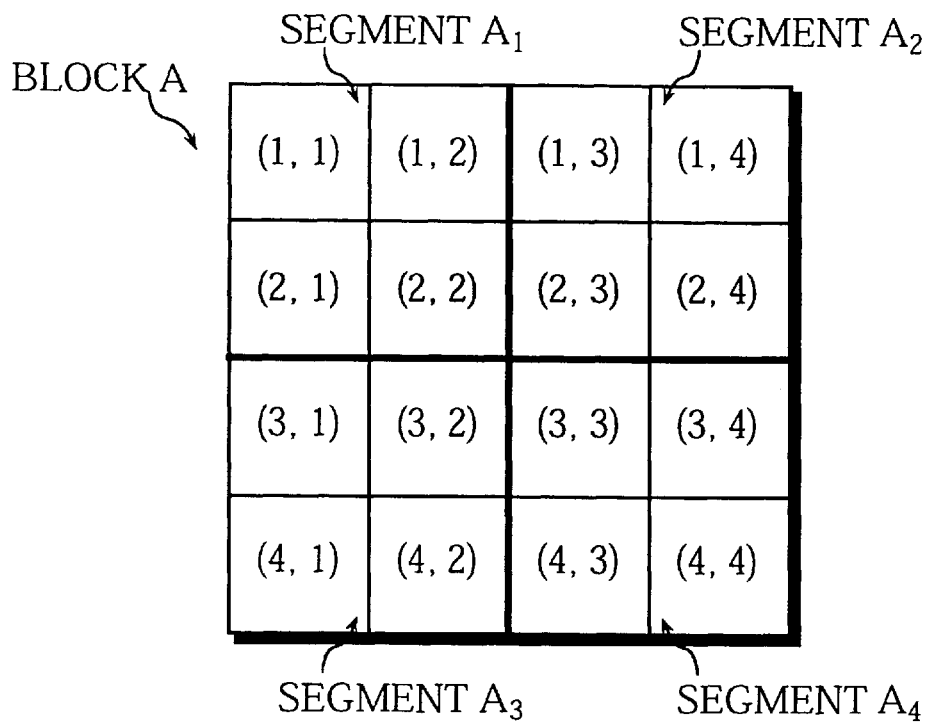
FIG. 3 shows the codes for each pixel that composes a block region in the present embodiment.
FIG. 4 shows an original image data table used in the present embodiment.

FIG. 3 shows the codes (i,j) for each pixel that composes the block region A, where i=1,2,3,4 and j=1,2,3,4. As shown in FIG. 3, when the four segments produced by dividing the block region A are segment A1, A2, A3, and A4, each segment includes four pixels, as shown in Table 1 below.

TABLE 1

| Segment | Pixel Codes |
| --- | --- |
| A1 | (1,1), (1,2), (2,1), (2,2) |
| A2 | (1,3), (1,4), (2,3), (2,4) |
| A3 | (3,1), (3,2), (4,1), (4,2) |
| A4 | (3,3), (3,4), (4,3), (4,4) |

FIG. 4 shows an original image data table that is provided in the storage apparatus 4 for storing the original image data. When the operation processing apparatus 3 inputs the original image data into the storage apparatus 4, luminance bit values f1, f2, f3, and f4 are stored in the original image data table for each of the 16 pixels in the original image data.

The following is an explanation of the term "bit planes". In the image data, when the luminance values of each pixel that composes a block region are expressed using a number of bits, it is can be seen that a plurality of levels are present in a hierarchy, with each of these levels being a bit plane.

Figure 5:
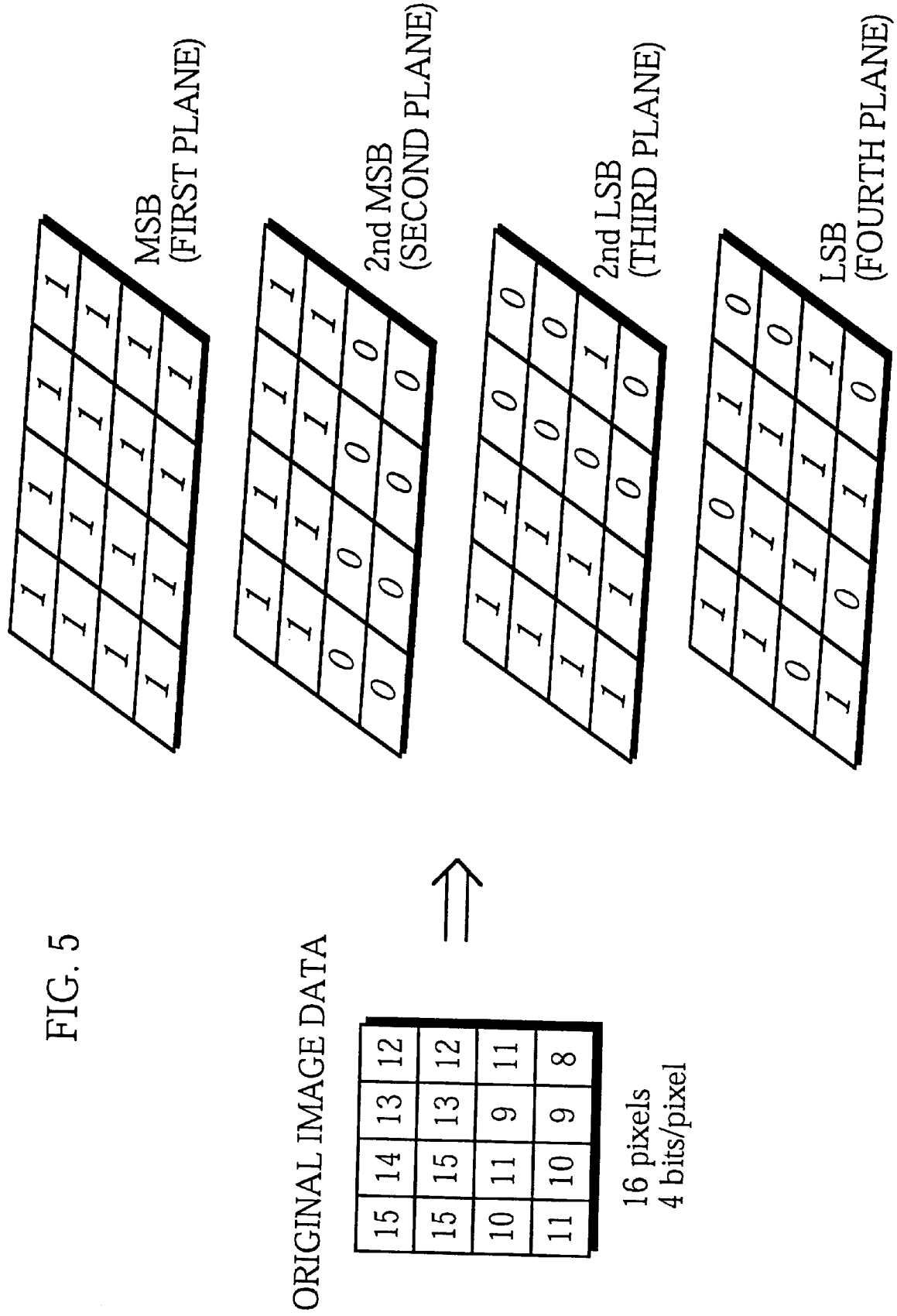
FIG. 5 shows an example of the bit planes in a set of original image data.

FIG. 5 shows an example of the original image data described above. As shown in the drawing, the hierarchy includes four bit planes. These are the MSB plane (the highest bit plane, MSB referring to the "Most Significant Bit"), the $2^{nd}$ MSB plane (the second bit plane), the $2^{nd}$ LSB plane (the third bit plane, LSB referring to the "Least Significant Bit"), and the LSB plane (the fourth bit plane).

The MSB plane is composed of the sixteen luminance bit values f1 corresponding to each pixel in the block region A. In the same way, the $2^{nd}$ MSB plane, $2^{nd}$ LSB plane, and LSB plane are respectively composed of sixteen luminance bit values f2, sixteen luminance bit values f3, and sixteen luminance bit values f4.

FIGS. 6A–6D show the data tables that are provided in the storage apparatus 4 for storing the luminance bit values corresponding to each of the MSB plane to the LSB plane. The operation processing apparatus 3 reads the sixteen luminance bit values present in a bit plane from the original image data table in FIG. 4 and records values in these data tables.

This is to say, the operation processing apparatus 3 reads the luminance bit values in the MSB plane from the original image data table and, as shown in FIG. 6A, writes the luminance bit value f1 for each of the sixteen pixels in the MSB table.

In the same way, the operation processing apparatus 3 reads the luminance bit values in the other bit planes from the original image data table and, as shown in FIGS. 6B, 6C and 6D, writes the luminance bit values f2, f3, and f4 for each of the sixteen pixels in the various data tables.

In this specification, this selection of luminance bit values on different planes from the original image data is referred to as "division" into bit planes.

The operation processing apparatus 3 performs division into high-order and low-order bit planes and segmentation for the image data in a block region A that is subject to compression processing, out of the original image data in the storage apparatus 4. As a result, the operation processing apparatus 3 generates segmentation information and luminance information for high-order and low-order bit plane sets.

Here, the expression "high-order bit plane set" refers to a group of continuous bit planes that does not include the LSB plane, or to a single bit plane that is not the LSB plane. The expression "low-order bit plane set", meanwhile, refers to a group of continuous bit planes that are of a lower order than an adjacent high-order bit plane, or to a single lower-order bit plane that is adjacent to a high-order bit plane.

A variety of patterns may be used to determine which bit planes are the high-order bit plane set and the low-order bit plane set, although this first embodiment describes the case where the MSB plane (the highest bit plane) is the high-order plane set and the $2^{nd}$ MSB plane (the next highest bit plane) is the low-order plane set.

The present example deals with the case where division into segments is performed using a quadtree division method. Here, also, the division judgement condition for quadtree division is set as "divide segment if all luminance bit values in the segment are not equal". This condition is a condition for performing lossless compression.

The storage apparatus 4 includes a high-order division information unit d1, a high-order luminance information unit e1, a low-order division information part d2, and a low-order luminance information part e2 as regions for storing the segmentation information and luminance information for the high-order plane set and low-order plane set generated by the operation processing apparatus 3. Each of these storage units stores newly received data by appending it to data that the storage unit already stores.

Figure 7:
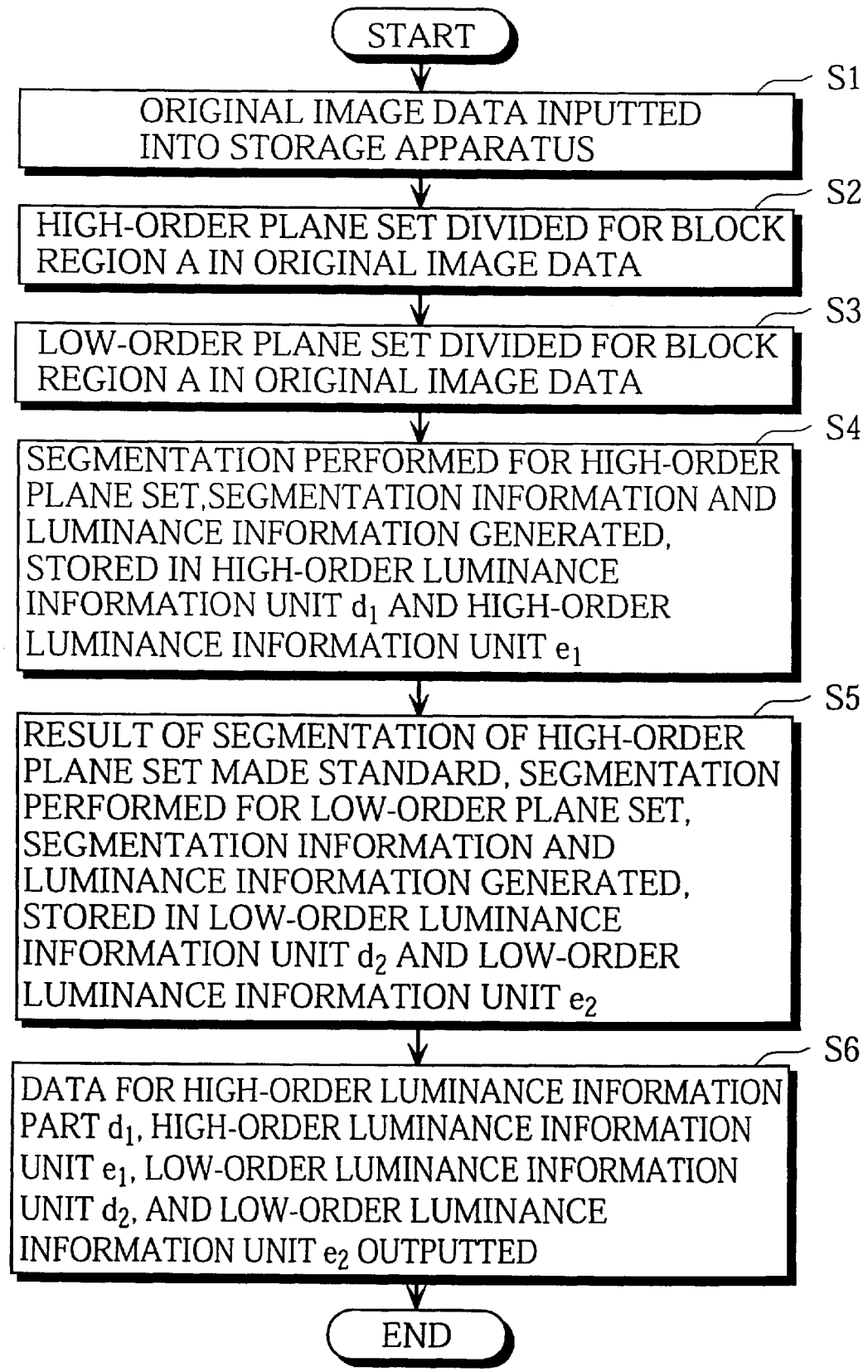
FIG. 7 is a flowchart for the image compression processing in the first embodiment.

FIG. 7 is a flowchart showing the image compression processing of the operation processing apparatus 3. The processing in this flowchart is described below.

When the image input apparatus 2 receives an input of original image data, the operation processing apparatus 3 first stores the original image data received by the image input apparatus 2 in the storage apparatus 4 (step S1).

Next, the operation processing apparatus 3 analyzes the image data in the block region A, out of the original image data stored in the storage apparatus 4, which is to be subjected to compression processing. As a result, the operation processing apparatus 3 finds the high-order plane set and the low-order plane set that is adjacent to the high-order plane set (steps S2,S3). The operation processing apparatus 3 then subjects the block region A to segmentation using quadtree division, based on the data in the high-order plane set found in step S2. The operation processing apparatus 3 generates segmentation information and luminance information and stores these in the high-order division information unit d1 and in the high-order luminance information unit e1 (step S4).

FIG. 8 is a flowchart showing a specific example of the processing in step S4.

First, the operation processing apparatus 3 uses the luminance bit values f1 in the MSB data table and the division judgement condition to judge whether to divide block region A. The operation processing apparatus 3 judges whether all pixels in the block region have the same luminance bit value f1 (all "1" or all "0"). If so, the operation processing apparatus 3 decides not to divide the block region. If not, the operation processing apparatus 3 decides to divide the block region (step S101).

When the operation processing apparatus 3 decides not to divide the block region in step S101, the operation processing apparatus 3 stores the value "0" showing "no division" in the high-order division information unit d1. The operation processing apparatus 3 then reads the luminance bit value f1 from the MSB data table and sets the value in the high-order luminance information unit e1 (step S102).

On the other hand, when the operation processing apparatus 3 decides to divide the block region in step S101, the operation processing apparatus 3 stores the value "1" in the high-order division information unit d1 (step S103).

The operation processing apparatus 3 next judges whether to perform a second division on each of the segments A1, A2, A3, and A4 produced by dividing the block region A. To do so, the operation processing apparatus 3 reads the luminance bit value f1 for all pixels in each segment and judges the read values for one segment at a time according to the division judgement condition, The operation processing apparatus 3 then transfers a 4-bit value to the high-order division information unit d1. Each bit in this 4-bit value represents one of the segments A1, A2, A3, and A4 in order. The value of each bit in this data is such that "1" means "divide" and "0" means "no division" for the corresponding segment (step S104).

The operation processing apparatus 3 next takes the luminance bit value f1 from the MSB data table for each of the segments A1, A2, A3, and A4 in order and transfers the values f1 to the high-order luminance information unit e1 as the luminance bit value of the high-order plane set. When doing so, the operation processing apparatus 3 transfers one bit as the luminance information for segments that are judged in step S104 as not being divided. For segments that need to be divided, the operation processing apparatus 3 transfers luminance bit values f1 for four pixels (a total of 4 bits) in the order shown in Table 1 (step S105).

By doing so, the operation processing apparatus 3 writes segmentation information for the high-order plane set (MSB plane) into the high-order division information unit d1, and writes luminance information into the high-order luminance information unit e1.

In the present embodiment, each block region A includes 4*4 pixels, so that when the segments A1–A4 are divided, each sub-segment will be one pixel in size. AS a result, the present embodiment only performs segmentation twice.

When block regions are composed of $2^n*2^n$ pixels (where $n \geq 3$), the decision as to whether to initially divide the block region is also taken according to the same kind of division judgement condition. When dividing is performed, the same condition is then used to judge whether to subdivide the resulting segments into four smaller segments. The judgement continues for the divided segments until no segment requires further division. Here, division may be performed a maximum of n times.

In step S5 of FIG. 7, the results of the segmentation for the high-order plane set generated in step S4 are set as a standard and segmentation is performed for the low-order plane set according to the quadtree division method. This is to say, the operation processing apparatus 3 performs segmentation for regions (block region or segment) where the high-order plane set was not divided, based on data for the low-order plane set read in step S3. The operation processing apparatus 3 stores the resulting segmentation information and luminance information in the low-order division information part d2 and the low-order luminance information part e2. However, when the operation processing apparatus 3 divides all segments in step S4, it does not write segmentation information into the low-order division information part d2 (step S5).

FIG. 9 is a flowchart showing a specific example of the processing in step S5 of FIG. 7.

When the value of the high-order division information unit d1 written in step S4 is "0" ("Yes" in step S111), the operation processing apparatus 3 judges that division was not performed for the block region A in the high-order plane set, so that by performing the same processing as in steps S101 to S105 of FIG. 8, the operation processing apparatus 3 generates the segmentation information and luminance information for the low-order plane set and respectively stores them in the low-order division information part d2 and the low-order luminance information part e2 (S112).

On the other hand, when the value of the high-order division information unit d1 is not "0" ("No" in step S111), this means that division was performed for the block region A in the high-order plane set. As a result, the operation processing apparatus 3 selects an undivided segment (a segment for which division was judged unnecessary in step S104) in the high-order plane set.

The second to fifth bit values counting from the start of the high-order division information unit d1 show the respective division information for the segments A1, A2, A3, and A4. This means that if any of the second to fifth bits in the high-order division information unit d1 has the value "0", the corresponding segment is undivided, so that the operation processing apparatus 3 can refer to the data in the high-order division information unit d1 and select a segment that is undivided (step S113).

The operation processing apparatus 3 performs the following processing for each of the segments selected in step S113. The operation processing apparatus 3 analyzes the luminance bit value f2 of each pixel in a segment using the $2^{nd}$ MSB data table, and uses the division judgement condition to judge whether the segment needs to be further divided. The operation processing apparatus 3 then generates the segmentation information for the low-order plane set by setting the value "1" for segments that need to be divided and "0" for segments that do not need to be divided. The operation processing apparatus 3 transfers the resulting segmentation information to the low-order division information part d2 (step S114).

In step S113, however, when the data in the high-order division information unit d1 is "1,1111", all of the segments have been divided in the high-order plane set, so that data transfer is not performed to the low-order division information part d2, meaning that the low-order division information part d2 is empty.

After this, the operation processing apparatus 3 processes the segments A1, A2, A3, and A4 in order. The operation processing apparatus 3 reads the luminance bit values f2 for each pixel in the processed segment from the $2^{nd}$ MSB data table and transfers the read values to the low-order luminance information part e2.

For segments where the value "0" showing no division is transferred in step S114, the operation processing apparatus 3 transfers a single bit to the low-order luminance information unit e2 as the luminance bit values f2. If the value in step S114 is not "0", the operation processing apparatus 3 transfers four bits to the low-order luminance information unit e2 in the order shown in Table 1 as the luminance bit values f2 (step S115).

By performing the above processing, the operation processing apparatus 3 transfers segmentation information and luminance information for the low-order plane set to the low-order division information unit d2 and the low-order luminance information unit e2, respectively. However, when all of the segments are divided for the high-order plane set, the low-order division information unit d2 is empty.

In step S6 of FIG. 7, the output apparatus 5 outputs the segmentation information and luminance information for the high-order bit plane from the high-order division information unit d1 and the high-order luminance information unit e1, together with the segmentation information and luminance information for the low-order plane set from the low-order division information unit d2 and the low-order luminance information unit e2.

To do so, the output apparatus 5 is supplied with region information composed of segmentation information and luminance information for the high-order plane set and segmentation information and luminance information for the low-order plane set. This data is the compressed image data produced by compressing the high-order plane set and the low-order plane set in the original image data.

The output apparatus 5 outputs the region information for the high-order plane set and the low-order plane set that compose the original image data in order as a bitstream to the image decoding apparatus described in the second embodiment.

Here, to make progressive reproduction easier, the output unit 5 transmits the segmentation information and luminance information for the high-order plane set first in this order, before transmitting the segmentation information and luminance information for the low-order plane set in this order.

Figure 10A:
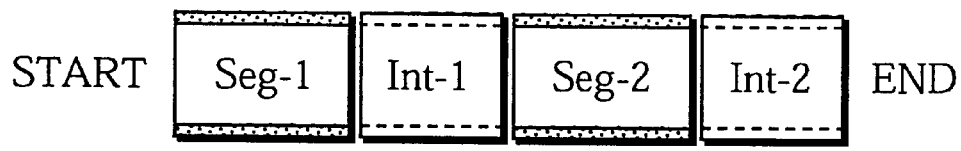
FIGS. 10A and 10B show bitstreams of compressed image data in the first embodiment of the present invention.
Figure 10B:
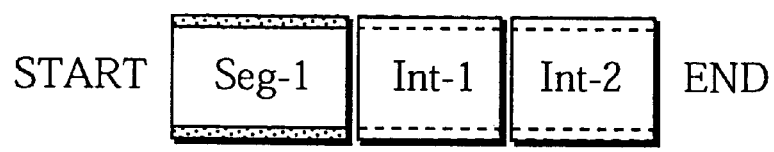

Bitstreams of compressed image data outputted from the output apparatus 5 are shown in FIGS. 10A and 10B.

FIG. 10A shows that the high-order region information composed of the high-order segmentation information "Seg-1" and high-order luminance information "Int-1" are always transmitted first, with the low-order segmentation information "Seg-2" and low-order luminance information "Int-2" following.

FIG. 10B shows that when low-order segmentation information "Seg-2" is not present, low-order luminance information "Int-2" is transmitted after high-order luminance information "Int-1".

The present embodiment describes a case where segmentation is performed with the MSB plane being set as the high-order plane set and the $2^{nd}$ MS plane being set as the low-order plane set, although the division into high-order plane set and low-order plane set may be performed in a variety of other ways.

As one example, division into levels may be performed so that two levels composed of the MSB plane and the $2^{nd}$ MSB plane are set as the high-order plane set and two levels composed of the $2^{nd}$ LSB plane and the LSB plane are set as the low-order plane set. In this case, the data table obtained by the division into the high-order plane set is shown in FIG. 6E.

As a different example, division into levels may be performed so that three levels composed of the MSB plane, the $2^{nd}$ MSB plane, and the $2^{nd}$ LSB plane are set as the high-order plane set and the LSB plane is set as the low-order plane set. In this case, the data table obtained by the division into the high-order plane set is shown in FIG. 6F.

As a modification, division may be performed so that the $2^{nd}$ MSB plane is set as the high-order plane set and the $2^{nd}$ LSB plane is set as the low-order plane set.

Second Embodiment

This second embodiment relates to an image decoding apparatus that corresponds to the image compression device of the first embodiment.

Figure 11:
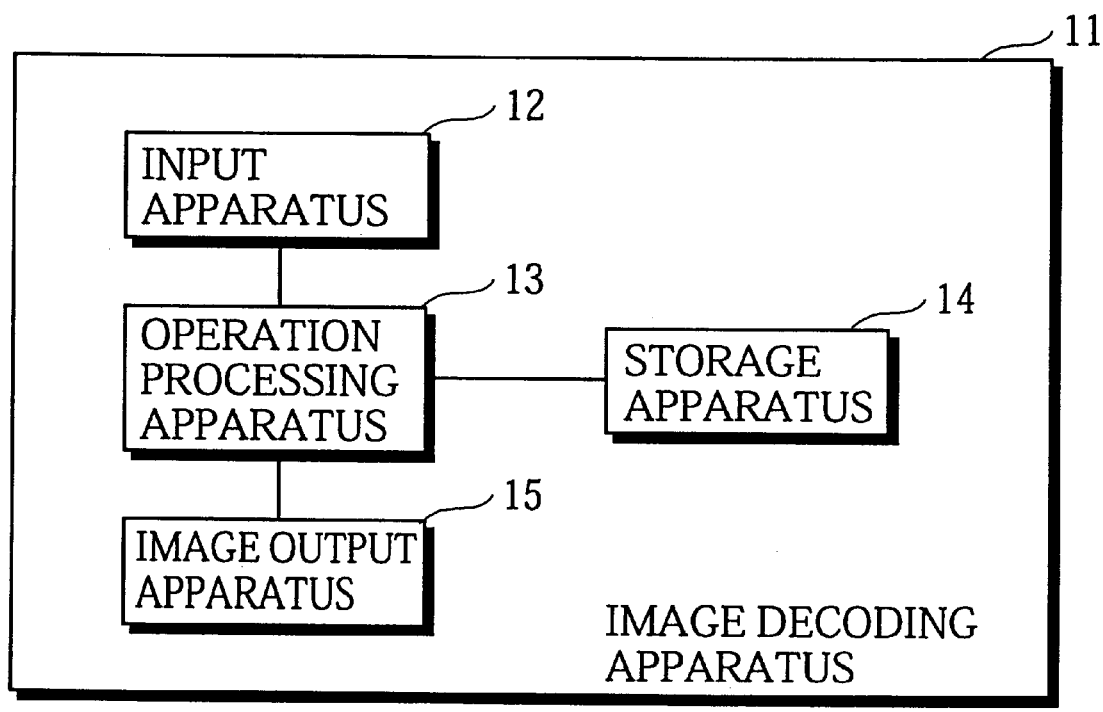
FIG. 11 shows a simplified construction of the image compression apparatus to which the second embodiment relates.

FIG. 11 shows the simplified configuration of the image decoding apparatus to which the present embodiment relates.

This image decoding apparatus 11 generates decoded data by decoding the compressed image data generated by the image compression apparatus 1 of the first embodiment. The image decoding apparatus 11 is composed of an input apparatus 12 for inputting the compressed image data, an operation processing apparatus 13 for reading the segmentation information and luminance information for the high-order plane set and low-order plane set from the compressed image data and performing region calculation and the like to decode the compressed image data, a storage apparatus 14 for storing the inputted data and segmentation information, and an image output apparatus 15 for outputting a decoded and reproduced image.

The settings for the high-order plane set and low-order plane set and the settings for the block region A are assumed here to be the same as those in the first embodiment.

In the image decoding apparatus 11, the storage apparatus 14 includes a compressed image data storage unit C as a region for storing the inputted compressed image data. The storage apparatus 14 also includes a high-order division information unit D1, a high-order luminance information unit E1, a low-order division information unit D2, and a low-order luminance information unit E2 as regions for storing the segmentation information and luminance information of the high-order plane set and low-order plane set that are read by the operation processing apparatus 13. Each of these storage units stores newly received data by appending it to data that the storage unit already stores.

The storage apparatus 14 includes a decoded MSS data table and decoded $2^{nd}$ MSB data table in order to store the data produced by decoding the high-order plane set and the low-order plane set. These tables have the same format as those shown in FIGS. 6A and 6B, although no data is stored in an initial state.

Figure 12:
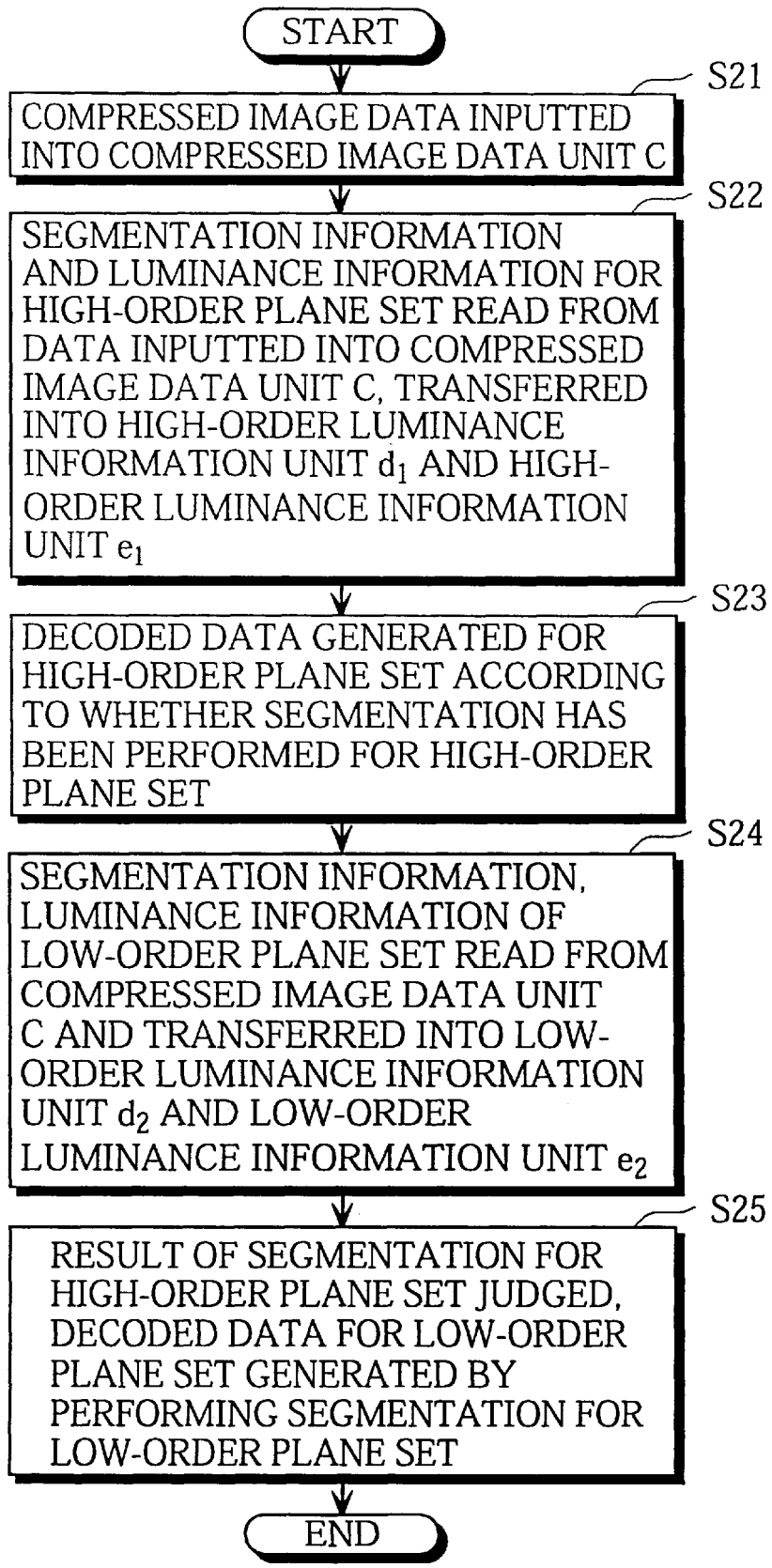
FIG. 12 is a flowchart for the decoding process in the second embodiment.

FIG. 12 is a flowchart for the decoding processing of the operation processing apparatus 13.

The operation processing apparatus 13 first inputs the compressed image data received by the input apparatus 12 into the compressed image data storage unit C (step S21). When doing so, the bitstream (see FIGS. 10A and 10B) for the compressed image data sent from the image compression apparatus 1 is inputted starting from the front.

The operation processing apparatus 13 reads the segmentation information and the luminance information for the high-order plane set from the data in the compressed image data storage unit C, and transfers the read data respectively to the high-order division information unit D1 and the high-order luminance information unit E1 (step S22).

The operation processing apparatus 13 uses the segmentation information read in step S22 and performs segmentation for the high-order plane set, before combining the result of this division with the luminance information read in step S22. By doing so, the operation processing apparatus 13 generates decoded data for the high-order plane set which it stores in the storage apparatus 14 (step S23).

Figure 13:
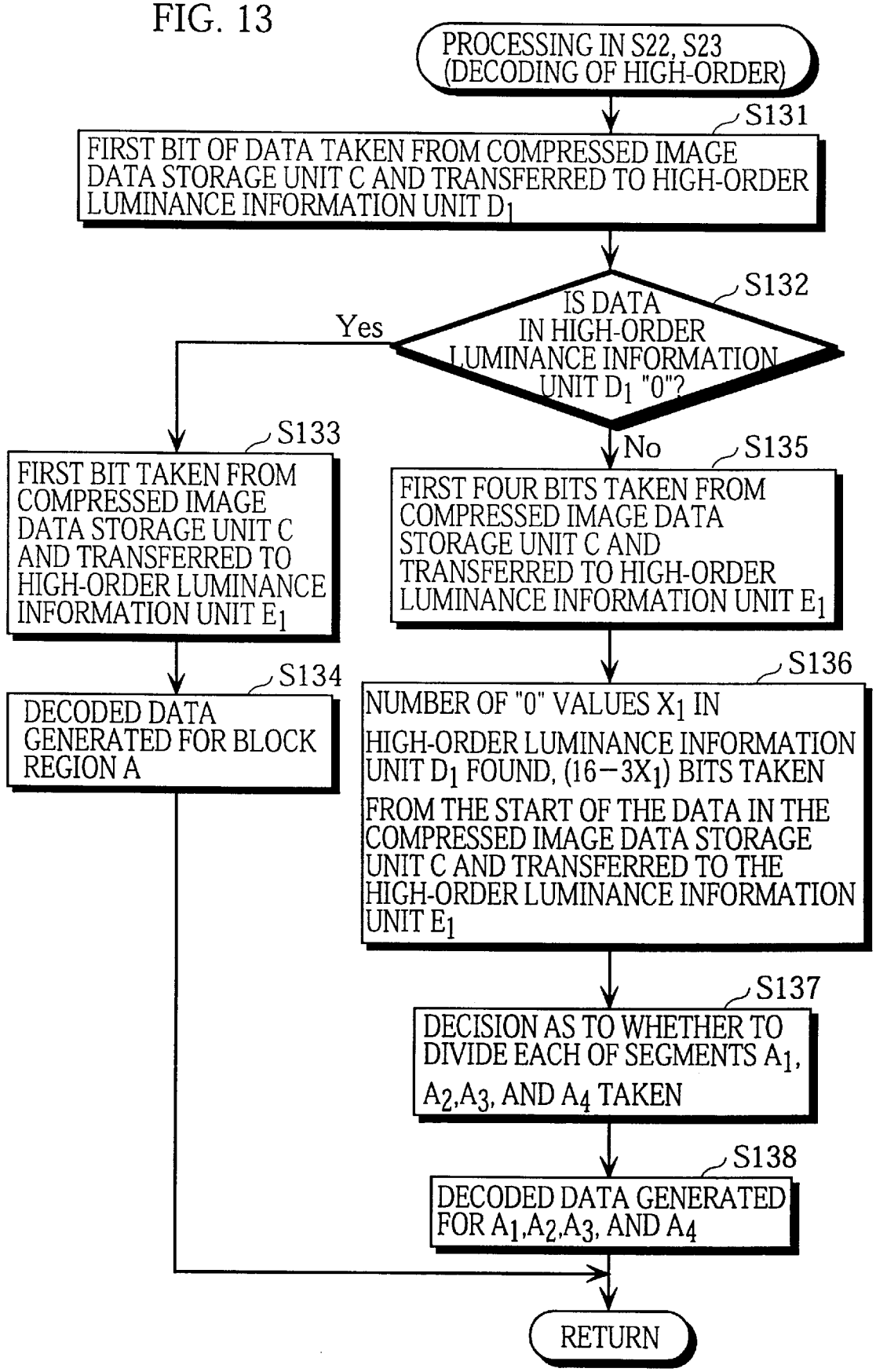
FIG. 13 is a flowchart showing a specific example of the processing in steps S22 and S23 of FIG. 12.

FIG. 13 is a flowchart showing a specific example of the decoding process for the high-order plane set. This processing corresponds to steps S22 and S23 in FIG. 12.

First, the operation processing apparatus 13 takes out the first bit from the data in the compressed image data storage unit C and transfers it to the high-order division information unit D1 as segmentation information.

Here, if the data value transferred to the high-order division information unit D1 is "0" ("Yes" in step S132), the operation processing apparatus 13 judges that "block region A is not divided", and so takes out the first bit of data in the compressed image data storage unit C and transfers it to the high-order luminance information unit E1. At the same time, the operation processing apparatus 13 sets this value as the luminance bit value f1 for the entire block region A and writes it into every entry in the MSB data table. This completes the decoding of the high-order plane set (step S134).

On the other hand, if the data value transferred to the high-order division information unit D1 is "1" ("No" in step S132), the operation processing apparatus 13 judges that "block region A is divided", and so takes out the first four bits of data in the compressed image data storage unit C and sends them to the high-order division information unit D1. As a result, a total of five bits are stored in the high-order division information unit D1 (step S135).

Next, the operation processing apparatus 13 finds the number $X_1$ of "0" values (the number of undivided segments) in the high-order division information unit D1, takes out the first $(16-3X_1)$ bits of data in the compressed image data storage unit C, and transfers the data to the high-order luminance information unit E1 as the luminance information for the high-order plane set (step S136).

The operation processing apparatus 13 then performs decoding for the segments A1, A2, A3, and A4 using the segmentation information in the high-order division information unit D1 and the luminance information in the high-order luminance information unit E1, as described below. By doing so, the operation processing apparatus 3 generates decoded data for the high-order plane set.

The operation processing apparatus 13 first judges whether to divide each of the segments A1, A2, A3, and A4, according to the data in the high-order division information unit D1.

The four bits given as the second to fifth bits from the front of the high-order division information unit D1 respectively show whether each of the four segments A1, A2, A3, and A4 are to be divided for the high-order plane set when any of these bits is "0", the operation processing apparatus 13 judges that the corresponding section is not to be divided, while when any bit is "1", the operation processing apparatus 13 judges that the corresponding section is to be divided.

When the operation processing apparatus 13 judges that segment A1 is not to be divided, the first bit in the data in the high-order luminance information unit E1 is written into the MSB table as the luminance bit value f1 for the four pixels (1,1), (1,2), (2,1), and (2,2) that compose segment A1.

On the other hand, when the operation processing apparatus 13 judges that segment A1 is to be divided, the first four bits in the data in the high-order luminance information unit E1 are written into the MSB table as the respective luminance bit values f1 for the four pixels (1,1), (1,2), (2,1), and (2,2).

Next, when the operation processing apparatus 13 judges that segment A2 is not to be divided, the next bit in the high-order luminance information unit E1 is written into the MSB table as the luminance bit value f1 for the four pixels (1,3), (1,4), (2,3), and (2,4) that compose segment A2.

On the other hand, when the operation processing apparatus 13 judges that segment A2 is to be divided, the next four bits in the high-order luminance information unit E1 are written into the MSB table as the respective luminance bit values f1 for the four pixels (2,1), (2,2), (2,3), and (2,4).

The operation processing apparatus 13 then performs similar judgements as to whether to divide segments A3 and A4, and based on the judgement results, takes out the luminance bit value(s) f1 for the pixels in segments A3 and A4 from the high-order luminance information unit E1 and written them into the MSB data table (step S138).

By doing so, the operation processing apparatus 13 decodes the luminance bit value f1 for the 16 pixels in the MSB data table in the storage apparatus 14, thereby completing the decoding of the high-order plane set (MSB plane).

The operation processing apparatus 13 next reads the segmentation information and the luminance information for the low-order plane set from the data remaining in the compressed image data storage unit C, and transfers the data to the low-order division information unit D2 and the low-order luminance information unit E2, respectively (step S24).

After this, the operation processing apparatus 13 performs segmentation for the low-order plane set, with the result of segmentation for the high-order plane set as a standard, using the segmentation information for the low-order plane set read in step S24. The operation processing apparatus 13 then combines the result of this division with the luminance information for the low-order plane set read in step S24. By doing so, the operation processing apparatus 13 generates decoded data for the low-order plane set which it stores in the storage apparatus 14 (step S25).

Figure 14:
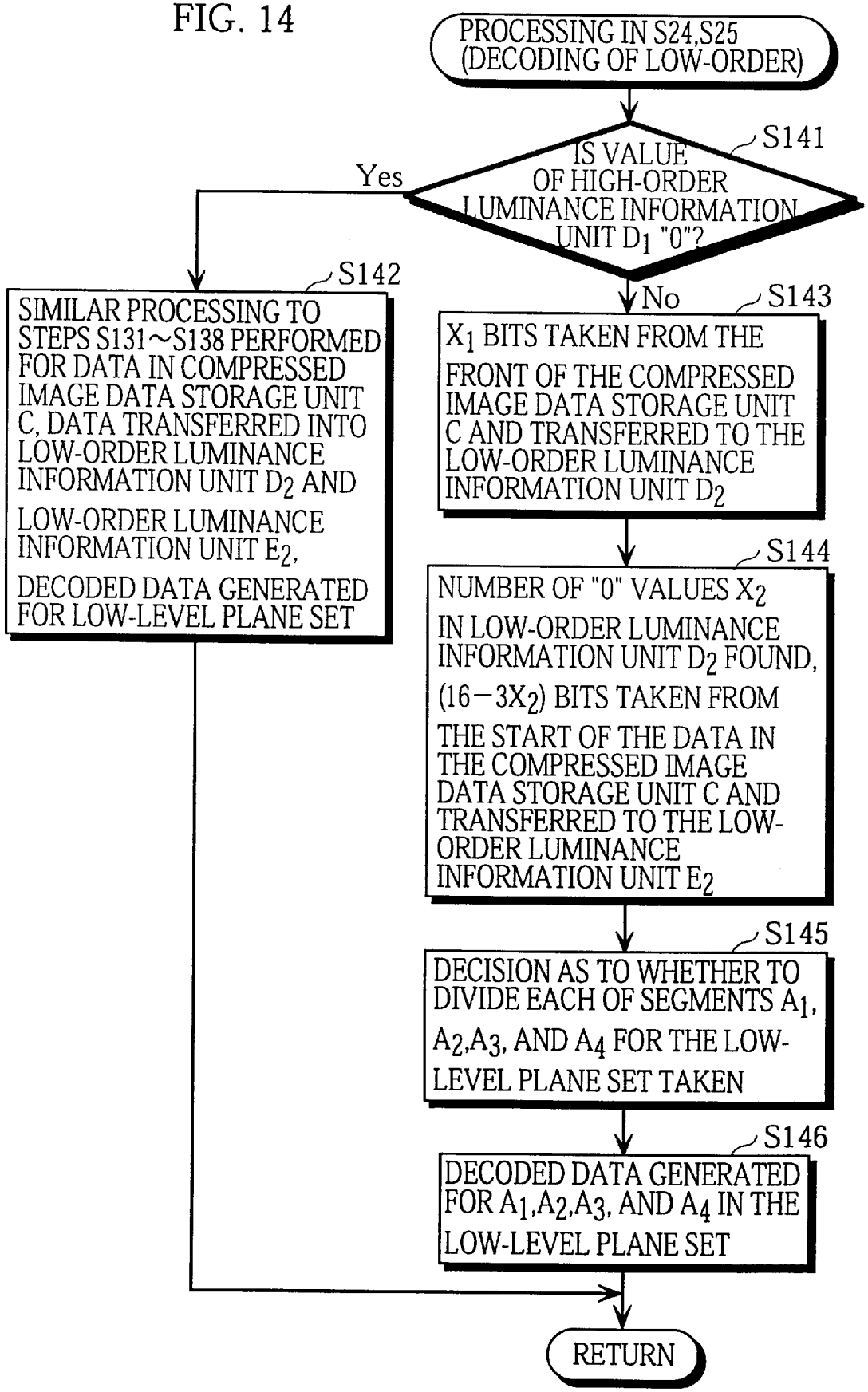
FIG. 14 is a flowchart showing a specific example of the processing in steps S24 and S25 of FIG. 12.

FIG. 14 is a flowchart showing a specific example of the decoding process for the low-order plane set. This processing corresponds to steps S24 and S25 in FIG. 14.

When the data in the high-order division information unit D1 is "0" ("Yes" in step S141), this shows that the block region A was not divided at the high-order plane set, so that the segmentation of block A starts from the beginning. This is to say, the same processing as the flowchart in FIG. 13 is performed using the data in the compressed image data storage unit C, so that the image processing apparatus 13 writes the segmentation information and luminance information for the low-order plane set into the low-order division information unit D2 and the low-order luminance information unit E2. At the same time, the image processing apparatus 13 writes the luminance bit values f2 into the $2^{nd}$ MSB data table to generate decoded data for the low-order plane set (S142).

On the other hand, when the data in the high-order division information unit D1 is not "0" ("No" in step S141), the operation processing apparatus 13 judges that the block region A has already been divided for the high-order plane set, and so takes $X_1$ bits ($X_1$ being the same value as in step S136) from the start of the data in the compressed image data storage unit C, and transfers the read data to the low-order division information unit D2 as the segmentation information for the low-order plane set (S143).

Next, the image processing apparatus 13 finds the number $X_2$ of "0" values in the low-order division information unit D2, takes out the first ($16-3X_2$, bits of data in the compressed image data storage unit C, and transfers the data to the low-order luminance information unit E2 as the luminance information for the low-order plane set (step S144).

The operation processing apparatus 13 next judges whether to divide each of the segments A1, A2, A3, and A4 for the low-order plane set, using the data in the high-order division information unit D1 and in the low-order division information unit D2 as shown below.

The operation processing apparatus 13 selects segments that were not divided for the high-order plane set out of the segments A1, A2, A3, and A4. These are segments out of the segments A1, A2, A3, and A4 that were judged in step S137 as not being divided, and in the same way as step S137, the operation processing apparatus 13 perform this judgement by reading data from the high-order division information unit D1.

The operation processing apparatus 13 next reads data from the low-order division information unit D2 as the segmentation information of the selected segments.

In more detail, only segments, out of the segments A1, A2, A3, and A4, that were judged in step S137 as not being divided, that also have a corresponding bit value "0" in the low-order division information unit D2 are judged as not being divided, with all other segments being judged as being divided. As one example, when the two segments A1 and A3 are judged as not being divided for the high-order plane set and, when the data in the low-order division information unit D2 is "1,0", the operation processing apparatus 13 judges that only segment A3 is not divided in the low-order plane set, so that the other segments are divided.

When the data in the high-order division information unit D1 is "11111", showing that all of the segments A1, A2, A3, and A4 are divided in the high-order plane set, the operation processing apparatus 13 is unable to select a segment, and so judges for the low-order plane set that all of the segments A1, A2, A3, and A4 are divided (S145).

In this way, the operation processing apparatus 13 decodes A1, A2, A3 and A4 using information as to whether to divide or not divide segments A1, A2, A3 and A4 for the low-order plane set obtained in step S145 and data in the low-order luminance information unit E2. By doing so, the operation processing apparatus 13 generates decoded data for the low-order plane set. This decoding is the same as in step S138 of FIG. 13, and so will not be described (step S146).

As a result of the above processing, the operation processing apparatus 13 writes the luminance bit values f2 in the $2^{nd}$ MSB data table in the storage apparatus 14, thereby completing the decoding of the low-order plane set.

By storing decoded data in the MSB data table and the $2^{nd}$ MSB data table, the operation processing apparatus 13 obtains the upper two bits of decoded data. This data is the same as the data in FIG. 6E.

If a luminance value is assigned to each pixel, the reproduction data can be obtained from the high-order plane set and the low-order plane set, as shown in the example Table 2 below.

TABLE 2

| luminance bit value f1 | luminance bit value f2 | luminance value |
|---|---|---|
| 1 | 1 | 14 |
| 1 | 0 | 10 |
| 0 | 1 | 6 |
| 0 | 0 | 2 |

After completing the decoding for the high-order plane set (at the end of step S23), the operation processing apparatus 13 can assign the luminance value "11" where the luminance bit value f1 is "1" and the luminance value "3" where the luminance bit value f1 is "0" in the decoded data in the MSB table. By doing so, reproduction data can be obtained from just the high-order plane set of the original image data.

As a result, reproduction data is produced and outputted from the image output apparatus 15 when the operation processing apparatus 13 has completed the decoding of the high-order plane set, and when the operation processing apparatus 13 has completed the decoding of the low-order plane set. This means that progressive reproduction is achieved.

The operation processing apparatus 13 is configured so as to read the bitstream of compressed image data inputted into the compressed image data storage unit C from the start. Accordingly, when the high-order segmentation information "Seg-1" in the compressed image data is inputted, the operation processing apparatus 13 can commence the processing in step S22. Next, when the input of the high-order luminance information "Int-1" has been completed, the operation processing apparatus 13 can complete the processing as far as step S23 even If the data starting from the low-order segmentation information "Seg-2" has not been received. As a result, the decoding of the high-order plane set can be completed first.

As can be seen from the above explanation and from FIGS. 10A and 10B, when the image compression apparatus 1 transmits compressed image data to the image decoding apparatus 11, the high-order region information is sent first, with the low-order region information following. This is advantageous when performing progressive reproduction.

The operation processing apparatus 13 reads the segmentation information from the compressed image data storage unit C before reading the luminance information, so that when the image compression apparatus 1 transmits compressed image data to the image decoding apparatus 11, it is advantageous for the segmentation information to be transmitted before the luminance information.

Supplementary Example for the First Embodiment

FIG. 15 shows an example of the image compression processing performed in the first embodiment for the original image data shown in FIG. 5.

When the operation processing apparatus 3 performs segmentation for the high-order plane set (MSB plane), the block region A is not divided, so that the operation processing apparatus 3 only writes one bit "0" into the high-order division information unit d1 as the segmentation information, and only one bit "1" into the high-order luminance information unit e1 as the luminance information.

When performing segmentation for the low-order plane set ($2^{nd}$ MSB plane), the operation processing apparatus 3 divides the block region A into the segments A1, A2, A3 and A4. The operation processing apparatus 3 writes five bits "100000" into the low-order division information unit d2 as the segmentation information and four bits "1100" into the low-order luminance information unit e2 as the luminance information.

As a result, the bitstream of compressed image data outputted from the output apparatus 5 of the image compression apparatus 1 is "0,1,10000,1100", making the data total 11 bits.

The amount of data used to express the original image data is 64 bits, so that the compression rate is around 5.8.

Supplementary Example for the Second Embodiment

FIG. 16 shows an input of compressed image data produced by the first embodiment into the input apparatus 12 of the second embodiment and the decoding of the compressed image data.

When the bitstream of the compressed image data has been inputted into the input apparatus 12, the operation processing apparatus 13 writes the segmentation information "0" into high-order division information unit D1 and the luminance information "1" into the high-order luminance information unit E1 for the high-order plane set (MSB plane). By doing so, it can be seen that the block region A is not divided for the high-order plane set and that the luminance bit value f1 in the block region A is "1".

At this point, reproduction data that has block region A reproduced with the luminance value "11" is obtained.

Next, the operation processing apparatus 13 writes the segmentation information "10000" into the low-order division information unit D2 and the luminance information "1100" into the low-order luminance information unit E2 for the low-order plane set ($2^{nd}$ MSB plane). By doing so, it can be seen for the low-order plane set that the block region A is divided but that the segments A1, A2, A3, and A4 are not divided. Here, the luminance bit values f1 in the respective segments A1, A2, A3, and A4 are "1", "1", "0", and "0".

At this point, reproduction data that expresses the luminance values of segments A1, A2, A3, and A4 as "14", "14", "10", and "10" is obtained.

Comparative Example 1

Figures 17A, 17B:
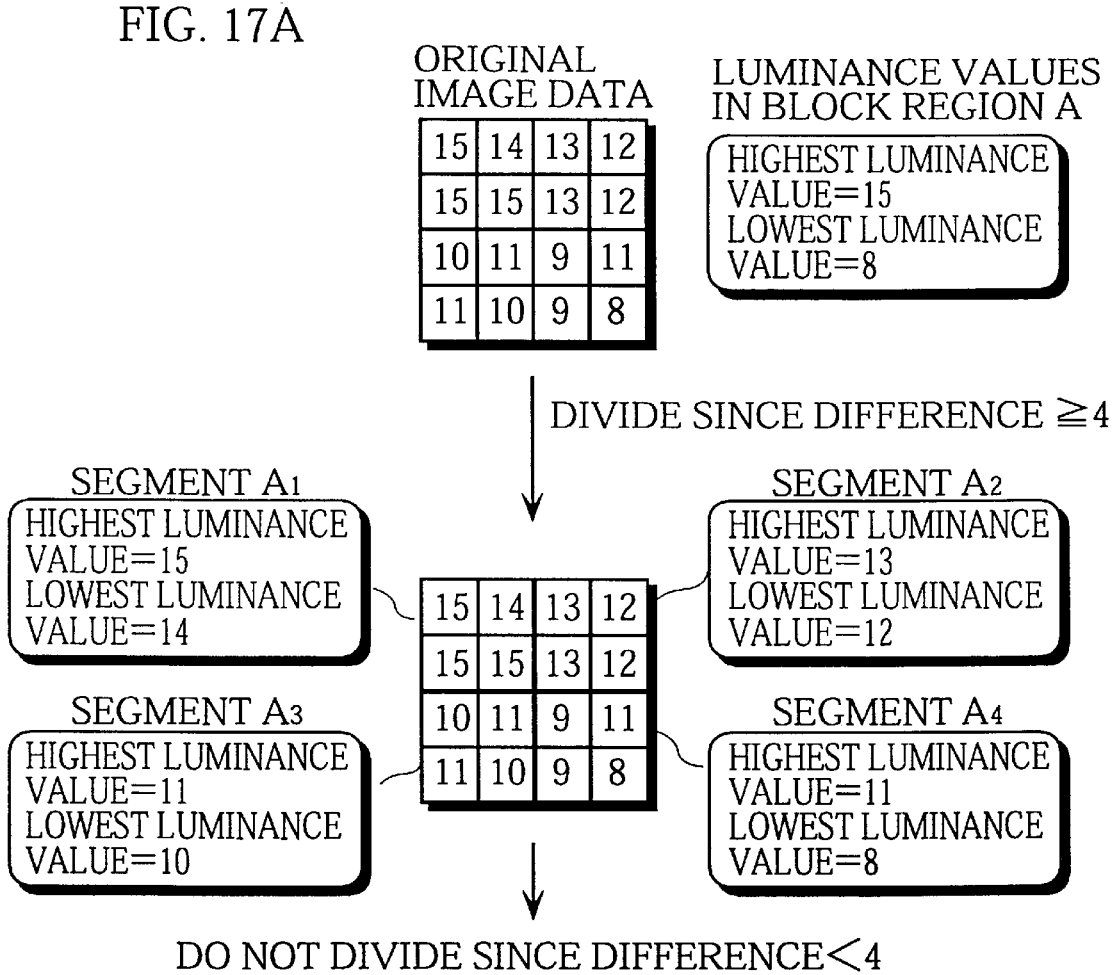
FIGS. 17A and 17B show the image compression and decoding processing in the first comparative example.

FIG. 17A show the generation of compressed image data where quadtree division in performed in a conventional method for the same original image data as used in the first embodiment. In this example, the division judgement standard is set as "divide where the difference between the highest luminance value and lowest luminance value in a region is 4 or above".

The luminance information for each divided segment is expressed using 2 bits. As one example, this may be set so that the value "00" shows that the average of luminance values in the segment is below "4", the value "01" shows that the average is such that "4≦average<8", the value "10" shows that the average is such that "8≦average<12", and the value "11" shows that the average is "12" or above.

When doing so, the highest luminance value in the block region A of the original image data is "15" while the lowest luminance value is "8". This satisfies the condition in that the difference between the highest and lowest luminance values is 4 or greater, so that the block region A is divided. However, none of the resulting segments satisfies the same condition, so that none of the segments is divided. This completes the segmentation.

Consequently the segmentation information becomes "1,0000", making a total of 5 bits. The respective luminance components for the segments A1, A2, A3, and A4 are "11", "11", "10", and "10", making a total of 8 bits for the luminance information. Adding these gives a total of 13 bits for the compressed image data.

Since the original image data was expressed using 64 bits, this makes the compression rate of the comparative example around 4.9.

FIG. 17B shows the decoded data and reproduction data obtained using this compressed image data.

In FIG. 17B, decoded data where the luminance bit values of segments A1, A2, A3, and A4 are "11", "11", "10", and "10" is obtained by decoding the compressed data shown above using a quadtree division method.

If luminance values are assigned to these luminance bit values in the decoded data as shown in Table 2, reproduction data is produced where the luminance values of the segments A1, A2, A3, and A4 are "14", "14", "10", "10".

This result is the same as the reproduction data produced by the decoding shown in FIG. 16 for the supplementary example of the second embodiment. By comparing the first and second embodiments with the comparative example, however, it can be seen that while the resolution of the decoded data is the same, the first and second embodiments have a higher compression rate.

Third Embodiment

The overall construction of the image compression apparatus in this embodiment is the same as in the first embodiment, so that the same reference numerals as FIG. 2 are used.

The composition of the original image data, the settings for the block region A, and the division judgement condition are also the same as in the first embodiment. However, the present embodiment differs from the first embodiment in that the first embodiment only divides the original image data into a high-order plane set and a low-order plane set and generates compressed image data for each. The present embodiment operates so that when dividing the original image data into a $1^{st}$ plane set that corresponds to the high-order plane set and a $2^{nd}$ plane set that corresponds to the low-order plane set, if the $2^{nd}$ plane set does not include the LSB plane, segmentation is again performed for the $2^{nd}$ plane set to produce a $3^{rd}$ or later plane set below the $2^{nd}$ plane set.

As before, a variety of settings are possible for segmentation into plane sets in the present embodiment. The following explanation deals with the case where the MSB plane is the $1^{st}$ plane set, the $2^{nd}$ MSB plane is the $2^{nd}$ plane set, the $2^{nd}$ LSB plane is the $_3$rd plane set, and the LSB plane is the $4^{th}$ plane set.

The storage apparatus 4 includes a $1^{st}$ division information unit d1, a $1^{st}$ luminance information unit e1, a $2^{nd}$ division information unit d2, a $2^{nd}$ luminance information unit e2, a $3^{rd}$ division information unit d3, a $3^{rd}$ luminance information unit e3, a $4^{th}$ division information unit d4, and a $4^{th}$ luminance information unit e4 for storing the segmentation information and luminance information of the $1^{st}$ plane set to $4^{th}$ plane set generated by the operation processing apparatus 3. Each of these storage units stores newly received data by appending it to data that the storage unit already stores.

It is assumed that the storage apparatus 4 includes the same data tables as FIGS. 6A to 6D for storing the luminance bit values obtained by dividing the original image data into the MSB plane to LSB plane.

Figure 18:
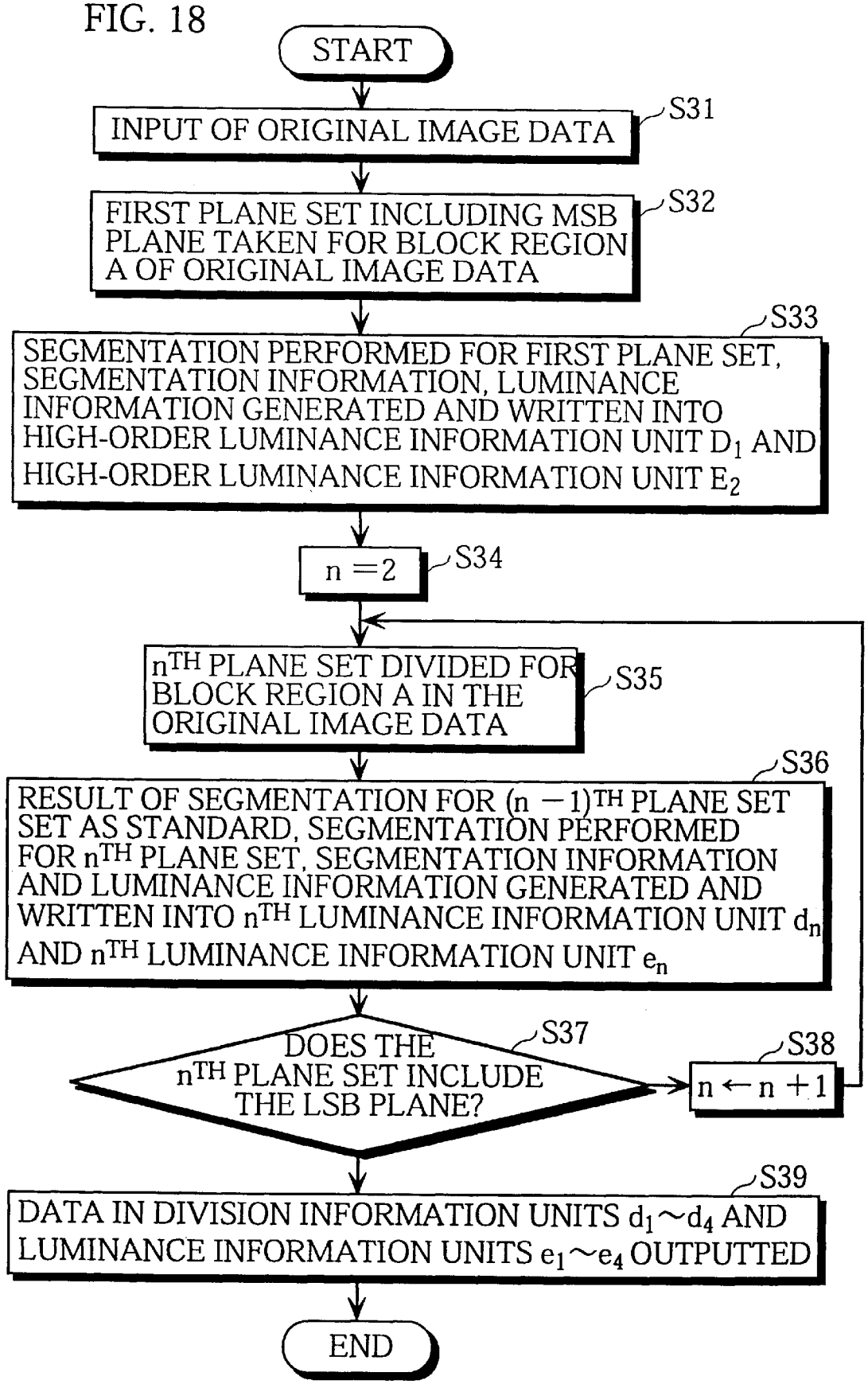
FIG. 18 is a flowchart for the image compression processing in the third embodiment.

FIG. 18 is a flowchart showing the processing of the operation processing apparatus 3 in the present embodiment when the original image data has been inputted, the operation processing apparatus 3 first stores the original image data received by the image input apparatus 2 into the storage apparatus 4 (S31).

Next, the operation processing apparatus 3 divides the $1_{st}$ plane set from the image data in a predetermined block region A which is to be subjected to compression processing, out of the original image data in the storage apparatus 4 (step S32).

The operation processing apparatus 3 next performs segmentation for the $1^{st}$ plane set according to a quadtree division method, and stores the segmentation information and luminance information of the $1^{st}$ plane set in the $1^{st}$ division information unit d1 and $1^{st}$ luminance information unit e1, respectively (step S33). This processing in step S33 is the same as that shown in FIG. 8 for the first embodiment.

Next, the operation processing apparatus 3 divides the $2^{nd}$ plane set which is adjacent to the $1^{st}$ plane set in a lower position (step S35).

The operation processing apparatus 3 sets the result of the segmentation for the $1^{st}$ plane set in step S34 as a standard and performs quadtree division for the $2^{nd}$ plane set. In more detail, the operation processing apparatus 3 selects undivided regions (block regions or segments) that are not divided for the $1^{st}$ plane set, and performs segmentation in these undivided regions for the $2^{nd}$ plane set. After this, the operation processing apparatus 3 writes the segmentation information and luminance information obtained by this segmentation into the $2^{nd}$ division information unit d2 and the $2^{nd}$ luminance information unit e2 (step S36). This processing in step S36 for the $2^{nd}$ plane set is the same as the processing shown in FIG. 9 for the first embodiment.

It the LSB plane is included in the low-order plane set divided by the step S34 ("Yes" in step S37), the division is assumed to have been taken as far as the lowest level, and so the processing is completed.

On the other hand, if the LSB plane is not included ("No" in step S37), the operation processing apparatus 3 performs quadtree division processing to divide the $3^{rd}$ plane set, based on the segmentation information for the $2^{nd}$ plane set. The operation processing apparatus 3 then writes the resulting segmentation information and luminance information in the $3^{rd}$ division information unit d3 and the $3^{rd}$ luminance information unit e3 (steps S35, S36).

The operation processing apparatus 3 repeats the processing described above until the plane set divided in step S34 includes the LSB plane (step S37).

In the present embodiment, the $1^{st}$ plane set to the $4^{th}$ plane set are divided one level at a time from the MSB plane to the LSB plane. Consequently, when the operation processing apparatus 3 has performed quadtree division for the $4^{th}$ plane set and written the resulting segmentation information and luminance information in the $4^{th}$ division information unit d4 and the $4^{th}$ luminance information unit e4 (steps S35, S36), the processing is completed.

The processing in step S36 for the $3^{rd}$ plane is the same as that shown in FIG. 9, and is described in more detail below.

If the value in the $2^{nd}$ division information unit d2 on the next higher level is "0", this means that the block region A is not divided for the $2^{nd}$ plane set. As a result, the operation processing apparatus 3 performs the processing in steps S101 to S105 to generate segmentation information and luminance information which it respectively writes into the $3^{rd}$ division information unit d3 and the $3^{rd}$ luminance information unit e3. Here, however, the luminance bit values f3 are read from the $2^{nd}$ LSB data table (S112).

When the value in the $2^{nd}$ division information unit d2 is not "0" ("No" in step S111), this means that the operation processing apparatus 3 divides the block region A for the $2^{nd}$ plane set, so that a segment that is yet to be divided for the $2^{nd}$ plane set is selected (step S113). The operation processing apparatus 3 can perform this selection by searching for "0" values in the second to fifth bits in the data in the $2^{nd}$ division information unit d2.

The operation processing apparatus 13 then judges whether to divide each of the segments found in step S113, based on the division judgement condition. The operation processing apparatus 13 generates the segmentation information for the $3^{rd}$ plane set in which the value "1" shows that division is performed and the value "0" shows that no division is performed. The operation processing apparatus 13 then transfers the segmentation information to the $3^{rd}$ division information unit d3 (step S114).

However, in step S113, when the operation processing apparatus 3 finds no "0" value in the $2^{nd}$ division information unit d2, this means that division is performed for all segments in the $2^{nd}$ plane set, so that the operation processing apparatus 3 transfers no data to the $3^{rd}$ division information unit d3, leaving the $3^{rd}$ division information unit d3 empty.

Next, the operation processing apparatus 3 processes the segments A1, A2, A3, and A4 in order. In doing so, the operation processing apparatus 3 reads the luminance bit values f3 for the pixels in the processed segment from the $2^{nd}$ LSB data table and transfers them to the $3^{rd}$ luminance information unit e3.

For segments where the operation processing apparatus 3 transfers the value "0" denoting no division in step S114, the operation processing apparatus 3 transfers only one bit as the luminance information of the segment. Other segments are divided, however, so that the operation processing apparatus 3 transfers four bits in the order shown in Table 1 as the luminance bit values f3 for the four pixels in the segment (step S115).

As a result of the above processing, the operation processing apparatus 3 writes the segmentation information and the luminance information for the $3^{rd}$ plane set into the $3^{rd}$ division information unit d3 and the $3^{rd}$ luminance information unit e3. However, when all of the segments are divided for the $2^{nd}$ plane set, the $3^{rd}$ division information unit d3 will be empty.

The operation processing apparatus 3 performs the processing in step S36 in the same way for the $4^{th}$ plane set as for the $3^{rd}$ plane set, so that no further explanation will be given. The only difference is that the operation processing apparatus 3 reads the luminance bit values f4 from the LSB data table.

By operating as described above, the operation processing apparatus 3 writes segmentation information and luminance information for the $1^{st}$ plane set to $4^{th}$ plane set into the division information units d1–d4 and the luminance information units e1–e4, respectively. However, when all of the segments are divided for any of the $1^{st}$ plane set to the $3^{rd}$ plane set, the division information unit on the succeeding lower level will be empty.

In step S39 of FIG. 18, the data written into the division information units d1–d4 and the luminance information units e1–e4 is outputted to the output unit 5 as the segmentation information and luminance information of the $1^{st}$ to $4^{th}$ plane sets.

As a result, the output apparatus 5 receives region information composed of segmentation information and luminance information for each of the $1^{st}$ to $4^{th}$ plane sets, with this data being the compressed image data generated by subjecting every bit plane of the original image data to compression processing. However, when any of the $2^{nd}$ to $4^{th}$ division information units d2 to d4 is empty, there will be no segmentation information for that plane set.

The output unit 5 outputs the region information for the $1^{st\ to}\ 4^{th}$ plane sets that compose the original image data in order as a bitstream to the image decoding apparatus of the fourth embodiment of the present invention.

As can be understood from the above explanation, the output unit 5 outputs the segmentation information and luminance information for the $1^{st}$ plane set first, and then outputs the segmentation information and luminance information for the $2^{nd}$ plane set, the segmentation information and luminance information for the $3^{rd}$ plane set, and the segmentation information and luminance information for the $4^{th}$ plane set. This is advantageous for progressive reproduction.

Figure 19A:
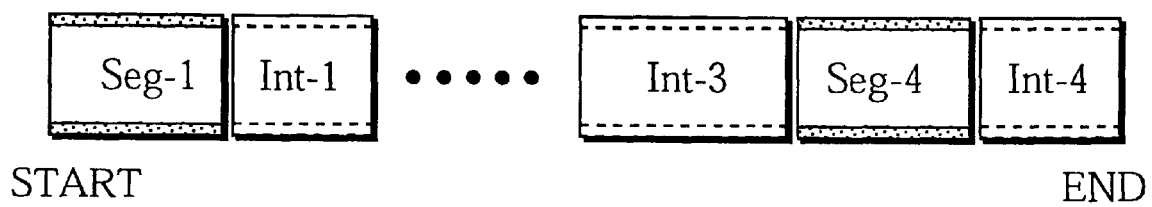
FIGS. 19A and 19B show bitstreams for compressed image data in the first embodiment.
Figure 19B:
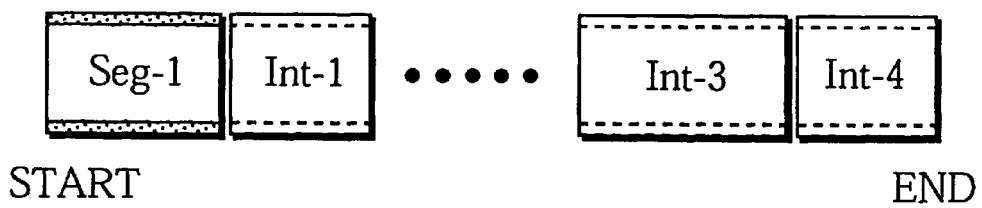

FIGS. 19A and 19B show bitstreams of original image data outputted by the output unit 5.

FIG. 19A shows that the region information composed of the first segmentation information "Seg-1" and first luminance information "Int-1" is at the front of the bitstream. After this comes the region information composed of the $2^{nd}$ segmentation information "Seg-2" and $2^{nd}$ luminance information "Int-2", the region information composed of the $3^{rd}$ segmentation information "Seg-3" and $3^{rd}$ luminance information "Int-3", and the region information composed of the $4^{th}$ segmentation information "Seg-4" and $4^{th}$ luminance information "Int-4".

FIG. 19B shows that when, for example, there is no $4^{th}$ segmentation information "Seg-4", the $4^{th}$ luminance information "Int-4" follows the $3^{rd}$ luminance information "Int-3".

In this way, the region information for the $1^{st}$ plane set is at the front of the bitstream, with the region information for the lower plane sets following. Accordingly, the image compression apparatus 1 outputs compressed image data that is suited to progressive reproduction.

In the present embodiment, an example when the image compression apparatus 1 takes one level at a time from the MSB plane to the LSB plane as one of the $1^{st}$ plane set to $4^{th}$ plane set and subjects the level to segmentation. However, the image compression apparatus 1 may use a variety of other patterns for taking bit planes and dividing them as the $1^{st}$ plane set to $4^{th}$ plane set.

As one example, the image compression apparatus 1 may perform segmentation so that the MSB plane and $2^{nd}$ MSB plane become the $1^{st}$ plane set, the $2^{nd}$ LSB plane becomes the $2^{nd}$ plane set, and the LSB plane becomes the $3^{r}$d plane set. This does not involve any significant changes to the present embodiment of the present invention.

Fourth Embodiment

This embodiment relates to an image decoding apparatus that corresponds to the image compression apparatus of the third embodiment.

The overall construction of the image decoding apparatus of the present embodiment is the same as that of image decoding apparatus in the second embodiment, so that the reference numerals given in FIG. 9 will be used in the following explanation.

The settings made for the $1^{st}$ to $4^{th}$ plane sets and the settings made for the block region A are the same as in the third embodiment.

In the same way as in the second embodiment, the storage apparatus 14 includes a compressed image data storage unit C as a region for storing the inputted compressed image data.

The storage apparatus 14 also includes $1^{st}$ to $4^{th}$ division information units D1–D4 and $1^{st}$ to $4^{th}$ luminance information units E1 to E4 as regions for respectively storing the segmentation information and luminance information for the $1^{st}$ to $4^{th}$ plane sets generated by the image processing apparatus 13. Each of these storage units stores newly received data by appending it to data which the storage unit already stores.

The storage apparatus 14 also includes four decoded data tables for storing the decoded data for the $1^{st}$ plane set to $4^{th}$ plane set. These decoded data tables are the same as the data tables shown in FIGS. 6A to 6D, except that they are initially empty.

FIG. 20 is a flowchart for the processing of the image processing apparatus 13 in the fourth embodiment.

The operation processing apparatus 13 first inputs the compressed image data received by the input apparatus 12 into the compressed image data storage unit C (step S41).

The operation processing apparatus 13 then reads the segmentation information and the luminance information for the $1^{st}$ plane set from the data inputted into the compressed image data storage unit C, and transfers the read data respectively to the 1st division information unit D1 and the $1^{st}$ luminance information unit E1 (step S42).

The operation processing apparatus 13 uses the segmentation information read in step S42 and performs segmentation for the $1^{st}$ plane set, before combining the result of this division with the luminance information read in step S42. By doing so, the operation processing apparatus 13 generates decoded data for the $1^{st}$ plane set which it stores in the storage apparatus 14 (step S43).

The processing in steps S42 and S43 can be performed in the same way as FIG. 13 given in the second embodiment, and by doing so, the operation processing apparatus 13 decodes luminance bit values f1 for all sixteen pixels, thereby completing the decoding of the $1^{st}$ plane set (MSB plane).

After this, the image processing apparatus 13 reads the segmentation information and luminance information for the $2^{nd}$ plane set from the data left in the compressed image data storage unit C after the decoding of the $1^{st}$ plane set. The image processing apparatus 13 transfers the read segmentation information and luminance information to the $2^{nd}$ division information unit D2 and the $2^{nd}$ luminance information unit E2 (step S45).

The operation processing apparatus 13 then uses the segmentation information read in step S45 and performs segmentation for the $2^{nd}$ plane set, with the result of segmentation for the $1^{st}$ plane set as a standard. The image processing apparatus 13 combines the result of this division with the luminance information of the $2^{nd}$ plane set read in step S45, and by doing so generates decoded data for the $2^{nd}$ plane set which it stores in the storage apparatus 14 (step S46).

The processing in steps S45 and S46 can be realized by the same processing described for FIG. 14 in the second embodiment.

When the $2^{nd}$ plane set includes the LSB plane ("Yes" in step S47), the decoding of plane sets is assumed to have been performed as far as the lowest plane set, so that the processing is completed. However, in the present embodiment, the $2^{nd}$ plane set does not include the LSB plane ("No" in step S47), so that the operation processing apparatus 13 makes the setting "n=3" in step S48, and performs the processing in steps S45 and S46 for the $3^{rd}$ plane set as described below.

The image processing apparatus 13 reads the segmentation information and luminance information for the $3^{rd}$ plane set from the data left in the compressed image data storage unit C after the decoding of the $2^{nd}$ plane set. The image processing apparatus 13 transfers the read segmentation information and luminance information to the $3^{rd}$ division information unit D3 and the $3^{rd}$ luminance information unit E3 (step S45).

The operation processing apparatus 13 then uses the segmentation information read in step S45 and performs segmentation for the $3^{rd}$ plane set, with the result of segmentation for the $2^{nd}$ plane set as a standard. The image processing apparatus 13 combines the result of this division with the luminance information of the $3^{rd}$ plane set read in step S45, and by doing so generates decoded data for the $3^{rd}$ plane set which it stores in the $2^{nd}$ LSB data table in the storage apparatus 14 (step S46).

The processing in steps S45 and S46 can be realized by the same processing described for FIG. 14 in the second embodiment.

The processing described above is repeated until the processed plane set includes the LSB plane ("Yes" in step S48). In the present embodiment, the processing is completed when the segmentation information and luminance information for the $4^{th}$ plane set have been respectively stored in $4^{th}$ division information unit D4 and the $4^{th}$ luminance information unit E4 and the decoded data for the $4^{th}$ plane set has been written into the LSB data table.

As a result of the above processing the MSB data table, $2^{nd}$ MSB data table, $2^{nd}$ LSB data table, and LSB data table in the storage apparatus 14 end up storing decoded data with the same content as the data tables in the third embodiment.

In this way, the image processing apparatus 13 uses the content of the four data tables in the storage apparatus 14 to produce decoded data with the same content as the original image data shown in FIG. 4.

The decoded data is sent to the image output apparatus 15 which uses the received reproduction data to perform lossless reproduction of the original image data.

As with the second embodiment, the present embodiment can obtain reproduction data for the upper 2 bits as shown in FIG. 6E when the decoding of the MSB plane is complete. The present embodiment can also obtain reproduction data for the upper 3 bits as shown in FIG. 6F when the decoding of the $2^{nd}$ LSB plane is complete.

Reproduction data is obtained at various stages, with the lossless reproduction of the original image data being performed when the decoding is complete. This means that progressive reproduction is achieved where an image with progressively higher resolution is displayed in four stages with the lossless reproduction of the original image data finally being achieved.

As described for the third embodiment above, the segmentation information and luminance information for the $1^{st}$ plane set are outputted in order from the image compression apparatus 1. For the same reasoning as given in the second embodiment, this is beneficial when reproducing plane sets in order starting from the high-order plane set. This means that the present invention transfers compressed image data that is well suited to progressive reproduction Supplementary Example for the Third Embodiment FIG. 21 shows the image compression processing according to the third embodiment for the original image data shown in FIG. 3.

When performing segmentation for the MSB plane, the operation processing apparatus 3 does not divide the block region A, and stores the one bit value "0" in the $1^{st}$ division information unit d1 as the segmentation information and the one-bit value "1" in the 1st luminance information unit e1 as the luminance information.

For the 2nd MSB plane, the operation processing apparatus 3 divides the block region A into the segments A1, A2, A3, and A4, but does not divide any of these segments. As a result, the operation processing apparatus 3 stores the five-bit value "10000" in the 2nd division information unit d2 as the segmentation information and the four-bit value "1100" in the 2nd luminance information unit e2 as the luminance information.

For the 2nd LSB plane, the operation processing apparatus 3 divides only the segment A4 out of the segments Al, A2, A3, and A4 that are not divided for the 2nd MSB plane. As a result, the operation processing apparatus 3 stores the four-bit value "0001" in the 3rd division information unit d3 as the segmentation information and the seven-bit value "101,0100" in the 3rd luminance information unit e3 as the luminance information.

For the LSB plane, the operation processing apparatus 3 divides all of the segments A1, A2, and A3 that are not divided for the 2nd LSB plane. As a result, the operation processing apparatus 3 stores the three-bit value "111" in the 4th division information unit d4 as the segmentation information and the sixteen-bit value "1011,1010,0110,1110" in the 4th luminance information unit e4 as the luminance information.

As a result of the above processing, the output apparatus 5 outputs "0,1,10000,1100,0001,1010100,111,10111010 01101110" as the bitstream for the compressed image data.

The segmentation information requires a total of 13 bits, while the luminance information requires a total of 28 bits. As a result, the compressed image data is expressed using 41 bits.

Since the total data amount of the original image data is 64 bits, the compression rate in the present case is around 1.5.

Supplementary Example for the Fourth Embodiment

FIGS. 22A to 22D show the decoding when the input apparatus 12 of the fourth embodiment receives the compressed image data produced by the third embodiment.

When the bitstream of compressed image data produced by the third embodiment in the above example is inputted into the input apparatus 12, the operation processing apparatus 13 writes the segmentation information "0" into the 1st division information unit D1 and the luminance information "1" into the 1st luminance information unit E1 for the 1st plane set (MSB plane).

In FIG. 22A, the segmentation information in the 1st division information unit D1 shows that block region A is not divided for the 1st plane set. The luminance information in the luminance information unit E1 shows that the luminance bit value f1 in the block region A is "1". In this way, decoded data is obtained.

At this point, reproduction data is obtained where the whole of block region A is reproduced using the luminance value "11".

In FIG. 22B, the operation processing apparatus 13 writes the segmentation information "10000" into the 2nd division information unit D2 and the luminance information "1100" into the 2nd luminance information unit E2 for the 2nd plane set (2nd MSB plane).

From the result of segmentation for the 1st plane set and the segmentation information in the 2nd division information unit D2, it can be seen that the block region A is divided for the 2nd plane set, but that none of the segments A1, A2, A3, or A4 are divided. From the luminance information in the 2nd luminance information unit E2, it can be seen that the luminance bit values f2 for the segments Al, A2, A3, and A4 are respectively "1", "0", and "0". In this way, decoded data is obtained.

At this point, reproduction data is obtained by assigning luminance values in accordance with Table 2 in the second embodiment. Accordingly, the segments A1, A2, A3, and A4 are reproduced using the respective luminance values "14", "14", "10", and "10".

In FIG. 22C, the operation processing apparatus 13 writes the segmentation information "0001" into the 3rd division information unit D3 and the luminance information "101, 0100" into the 3rd luminance information unit E3 for the 3rd plane set (2nd LSB plane).

From the result of segmentation for the 2nd plane set and the segmentation information in the 3rd division information unit D3, it can be seen that of the segments A1, A2, A3, and A4 that were not divided for the 2nd plane set, the segments A1, A2, and A3 are not divided, with only the segment A4 being divided for the 3rd plane set. From the luminance information in the 3rd luminance information unit E3, it can be seen that the luminance bit values f3 for the segments A1, A2, and A3 are respectively "1", "1", and "1", while the luminance bit values f3 for the segment A4 is the four-bit value "1011". In this way, decoded data is obtained.

At this point, reproduction data may be obtained by assigning luminance values in accordance with Table 3 shown below. This results in the segments A1, A2, A3 and A4 being reproduced with the luminance values shown in FIG. 22C.

TABLE 3

| luminance bit value f1 | luminance bit value f2 | luminance bit value f3 | luminance value |
|---|---|---|---|
| 1 | 1 | 1 | 14 |
| 1 | 1 | 0 | 12 |
| 1 | 0 | 1 | 10 |
| 1 | 0 | 0 | 8 |

In FIG. 22D, the operation processing apparatus 13 writes the segmentation information "111" into the 4th division information unit D4 and the luminance information "1011, 1010,0110,1110" into the 4th luminance information unit E4 for the 4th plane set (LSB plane).

From the result of segmentation for the 3rd plane set and the segmentation information in the 4th division information unit D4, it can be seen that the segments A1, A2, and A3 that were not divided for the 2nd LSB plane set are all divided. The luminance bit values f4 for the segments A1, A2, and A3 can be seen from the luminance information in the 4th luminance information unit E4. In this way, decoded data is obtained.

At this point, the decoded data is the same as the original image data.

Comparative Example 2

Figure 23A:
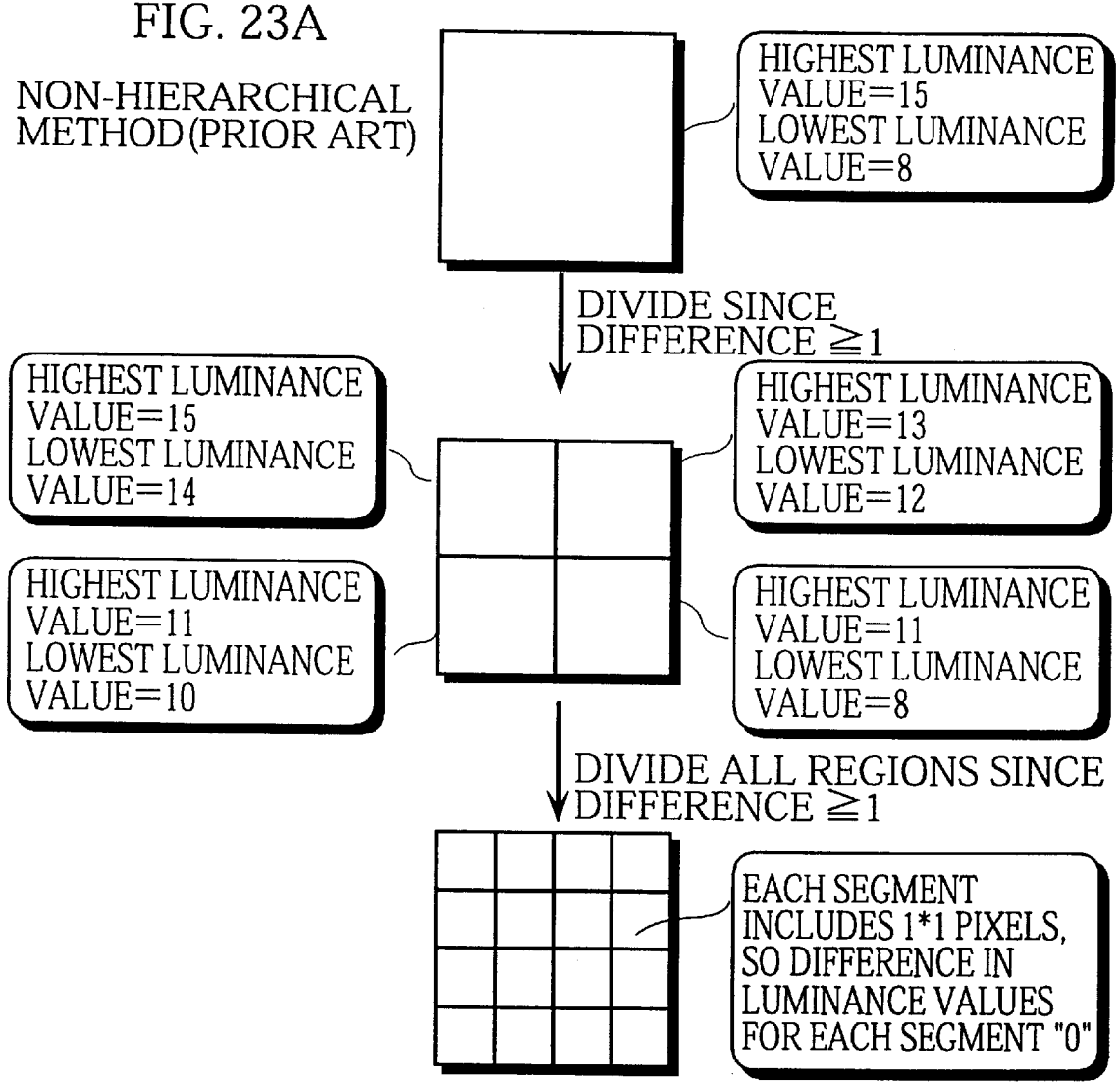

FIG. 23A show the generation of compressed image data where quadtree division is performed in a conventional lossless method for the same original image data as used in the third embodiment. In this example, the division judgement standard is set as "divide where the difference between the highest luminance value and lowest luminance value in a region is 1 or above" to achieve lossless compression. Putting this another way, this condition means that segments where not all pixels have the same luminance value are divided. Here, the luminance information for each divided segment is expressed using four bits.

For the block region A in the original image data, the highest and lowest luminance values are "15" and "8". This satisfies the branch judgement condition, so that block region A is divided. The luminance values in each of the resulting segments also satisfy the branch judgement condition, so that all four segments are further divided. As a result, the block region A is divided and subdivided until each segment is of one-pixel size, at which point segmentation is complete.

In this comparative example, the segmentation information is the five-bit value "1,1111".

Segmentation of the block region A produces a total of 16 segments which each require their own 4-bit luminance value. As a result, the luminance information uses a total of 64 bits.

The region information uses a total of 69 bits in this example, making the compression rate at "0.93", a value below "1" which means that the compressed image data is actually larger than the original image data.

FIG. 23B shows that the decoded data produced by decoding compressed image data according to a quadtree division method is the same as the original image data, This shows that the image compression and decompression are lossless.

While both comparative example 2 and the third/fourth embodiments achieve lossless compression, the third/fourth embodiments have by far the better compression rate.

Additional Comments on the First to Fourth Embodiments

The image compression processing in the third embodiment can achieve the same results as the first embodiment where image compression processing performs segmentation into only high-order and low-order plane sets. This is described below.

In such case, the third embodiment first performs segmentation for a combination of the MSB plane and the $2^{nd}$ MSB plane to obtain region information for these planes. The third embodiment sets the combination of these planes as the high-order plane set, obtains region information for the $2^{nd}$ LSB plane, and sets a combination of the MSB plane, the $2^{nd}$ MSB plane, and the $2^{nd}$ LSB plane as the high-order plane set. The third embodiment then sets the LSB plane as the low-order plane set and performs segmentation in the same way as the first embodiment to obtain region information. By doing so, the same results as the first embodiment are obtained.

In the first embodiment, when the image processing apparatus 3 does not divide the low-order plane set, which is to say when the segmentation information in the low-order division information unit d2 is not include a "1" value, the image processing apparatus 13 does not need to output the low-order segmentation information "Seg-2" to the image output apparatus 15. As a result, the low-order luminance information "Int-2" follows the high-order luminance information "Int-1".

When the image decoding apparatus of the second embodiment decodes this bitstream, in step S24, the image processing apparatus 13 may compare the number of bits in the data of the compressed image data storage unit C with the number of bits in the data in high-order luminance information unit E1. When the numbers are equal, the image processing apparatus 13 may decide not to divide the low-order plane set, thereby correctly decoding the bitstream.

The above .embodiments give an example where image compression and decoding are such that a segmentation of the low-order plane set uses the results of segmentation for the high-order plane set. However, segmentation of the low-order plane set not need to be related to the results of segmentation of the high-order plane set.

In comparisons, however, using the relations between the plane sets generally produces more compact compressed image data.

As one example, when image compression in the supplementary example for the first embodiment is performed without using the relations between the high-order plane set and the low-order plane set, the resulting region information is the same as in the original supplementary example for first embodiment.

When image compression is performed in the supplementary example for the third embodiment without using the relations between plane sets, the segmentation information for the MSB plane and $2^{nd}$ MSB plane are the same as in the original supplementary example. This modification will however produce the segmentation information "1,0001" for the $2^{nd}$ LSB plane set and the segmentation information "1,1111" for the LSB plane set, making the data total 3 bits larger that the total for the original supplementary example. In this case, the luminance information for each plane set is the same as in the original supplementary example for the third embodiment, so that the data total is 44 bits.

However, depending on the original image data, the opposite may also be case.

Figure 24:
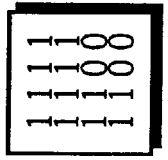
FIG. 24 shows the image compression processing in a modification of the embodiments.

FIG. 24 shows an example where the original image data includes 16 pixels which each use 3 bits. When the three bit planes are compressed using lossless segmentation, the compressed image data produced by a compression method using the relations between bit plane, such as the third/fourth embodiment, will include a total of 34 bits. For this example, a compression method that does not use the relations between bit planes produces compressed image data with a total of only 29 bits. However, it can still be seen that both methods produce compressed image data that is considerably smaller that the 44 bits required by the conventional method.

In the above embodiments, when the image compression apparatus outputs compressed image data with the region information for the high-order plane set first to achieve progressive reproduction. However, the techniques of the present invention are still valid for other output orders.

In the embodiments, the entire frame region of the original image data is processed as a block region. However, the techniques of the present invention are still valid even if a block region only represents one part of the frame region of the original image data.

The embodiments describe an example where segmentation is performed according to quadtree division for plane sets taken from the original image data. However, the present invention may use division methods aside from quadtree division. As one example, the present invention may divide image regions using any other well-known technique, such as division into convex polygons as in the cited document (1).

The present invention need not use the same method for dividing high-order plane set as for dividing low-order plane set. As one example, the invention may divide the high-order plane set using quadtree division and the low-order plane set using a convex polygon division method.

The embodiments describe a case using a judgement condition that achieves lossless compression as the division judgement condition, although the present invention may equally use other branch judgement conditions.

The above embodiments describe a case where the image compression apparatus and image decoding apparatus have a predetermined setting of certain bit planes as high-order bit planes and low-order bit planes. When there is no such setting for the image compression apparatus, the image compression apparatus may append the compressed image data with information showing the nature of the division into high-order bit planes and low-order bit planes. If the image compression apparatus informs the image decoding apparatus in this way, such a system will also realize the effects of the present invention.

It is possible for the processing of the operation calculation apparatus 3 (shown by the flowcharts in FIGS. 7 and 18) in the image compression apparatus and of the image processing apparatus 13 (shown by the flowcharts in FIGS. 12 and 20) of the image decoding apparatus to be achieved by software. In such case, a computer system may realize the image compression apparatus and image decoding apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image compression apparatus for producing compressed image information by compressing original image data that includes block image information, the block image information associating each pixel in a block composed of a plurality of pixels with a luminance value expressed using a plurality of bits, the image compression apparatus comprising:
an input unit for inputting the original image data;
a first compression processing unit for performing compression processing on a first plane set using a first segmentation method, the first plane set being composed of at least one consecutive bit plane in the block image information in the inputted original image data, to generate first region information composed of first segmentation information showing a first segmentation of the block and first luminance information showing luminance bit values that each correspond to a different segment produced by the first segmentation of the block;
a second compression processing unit for performing compression processing on a second plane set using a second segmentation method, the second plane set being composed of at least one consecutive bit plane that is adjacent to the first plane set at a lower bit position in the block image information, to generate second region information composed of second segmentation information showing a second segmentation of the block and second luminance information showing luminance bit values that each correspond to a different segment produced by the second segmentation of the block; and
an output unit for generating and outputting the compressed image information based on the first region information and the second region information.

2. The image compression apparatus of claim 1,
wherein the second compression processing unit generates the second region information by performing compression processing according to the second segmentation method with a result of the first segmentation of the block by the first compression processing unit as a standard.

3. The image compression apparatus of claim 2,
wherein the first segmentation method used by the first compression processing unit and the second segmentation method used by the second compression processing unit are both a quadtree segmentation method.

4. The image compression apparatus of claim 2,
wherein the first compression processing unit and the second compression processing unit perform segmentation using a division judgement condition whereby an analyzed area is divided if all pixels in the analyzed area do not have a same luminance bit value.

5. The image compression apparatus of claim 2,
wherein when outputting the compressed image information, the output unit outputs information corresponding to the first region information before information corresponding to the second region information.

6. The image compression apparatus of claim 5,
wherein when outputting the compressed image information, the output unit outputs information corresponding to the first segmentation information before outputting information corresponding to the first luminance information and outputs information corresponding to the second segmentation information before outputting information corresponding to the second luminance information.

7. An image compression apparatus for producing compressed image information by compressing original image data that includes block image information, the block image information associating each pixel in a block composed of a plurality of pixels with a luminance value expressed using a natural number k of bits, where $k \geq 22$, the image compression apparatus comprising:
an input unit for inputting the original image data;
a first compression processing unit for performing compression processing on a first plane set using a predetermined segmentation method, the first plane set being composed of at least one consecutive bit plane that includes a highest bit plane in the block image information in the inputted original image data, to generate first region information composed of first segmentation information showing a segmentation of the block and first luminance information showing luminance bit values that each correspond to a different segment produced by the segmentation of the block;
a second compression processing unit for performing compression processing on an $n^{th}$ plane set using the predetermined segmentation method and a standard that is a result of a segmentation of blocks for an $(n-1)^{th}$ plane set in the block image information, the $n^{th}$ plane set being composed of at least one consecutive bit plane that is adjacent to the $(n-1)^{th}$ plane at a lower bit position in the block image information, to generate $n^{th}$ region information composed of $n^{th}$ segmentation information showing an $n^{th}$ segmentation of blocks and $n^{th}$ luminance information showing luminance bit values that each correspond to a different segment produced by the $n^{th}$ segmentation of the block, wherein the second compression processing unit performs the compression processing for each value of n from 2 to a predetermined number that is no greater than k; and an output unit for generating and outputting compressed image information based on the first region information and the $n^{th}$ region information for every value of n from 2 to the predetermined number.

8. The image compression apparatus of claim 7, wherein the predetermined segmentation method used by the first compression processing unit and the second compression processing unit is a quadtree segmentation method.

9. The image compression apparatus of claim 7, wherein the first compression processing unit and the second compression processing unit perform segmentation using a division judgement condition whereby an analyzed area is divided if all pixels in the analyzed area do not have a same luminance bit value.

10. The image compression apparatus of claim 7, wherein when outputting the compressed image information, the output unit inductively repeats a process whereby the compressed image information for the $n^{th}$ region information is outputted after compressed image information for the $(n-1)^{th}$ region information is outputted from when n=2 to when n=the predetermined number.

11. An image decoding apparatus for performing decoding compressed image information, the compressed image information having been obtained by compressing original image data including block image information associating each pixel in a block composed of a plurality of pixels with a luminance value expressed using a plurality of bits, and the compressed image information having been generated from first region information composed of first segmentation information and first luminance information obtained by performing compression processing according to a first segmentation method on a first plane set composed of at least one consecutive bit plane in the block image information, and second region information composed of second segmentation information and second luminance information obtained by performing compression processing according to a second segmentation method on a second plane set composed of at least one consecutive bit plane that is adjacent to the first plane at a lower bit position in the block image information, the image decoding apparatus comprising:

an input unit for receiving an input of the compressed image information;

a first region information reading unit for reading the first segmentation information and the first luminance information from the inputted compressed image information;

a first decoding unit for performing segmentation of the block according to the first segmentation method using the first segmentation information read by the first region information reading unit, and for decoding the first plane set by assigning the first luminance information to segments obtained as a result of the segmentation;

a second region information reading unit for reading the second segmentation information and the second luminance information from the inputted compressed image information;

a second decoding unit for performing segmentation according to the second segmentation method for blocks using the second segmentation information read by the second region information reading unit, and for decoding the second plane set by assigning the second luminance information to segments obtained as a result of the segmentation; and a decoded image generation unit for generating decoded image information based on a decoding result of the first decoding unit and a decoding result of the second decoding unit.

12. The image decoding apparatus of claim 11, wherein the second segmentation information is obtained by performing compression using the second segmentation method with a result of segmentation for the first plane set as a standard, and the second decoding unit sets a result of segmentation of the first plane set by the first decoding unit as a standard, and performs segmentation according to the second segmentation method using the second segmentation information, before assigning the second luminance information to segments produced by the segmentation to decode the second plane set.

13. The image decoding apparatus of claim 12, wherein the compressed image information is produced using segmentation according to a quadtree segmentation method, and the first decoding unit and second decoding unit respectively decode the first plane set and the second plane set according to the quadtree segmentation method.

14. The image decoding apparatus of claim 12, wherein the compressed image information is obtained using a division judgement condition whereby an analyzed area is divided if all pixels in the analyzed area do not have a same luminance bit value, and the first decoding unit and second decoding unit use the division judgement condition when performing segmentation.

15. The image decoding apparatus of claim 12, wherein the decoded image generation unit generates first decoded image information using a result of the first decoding unit decoding the first plane set and the second decoded image information using the result of the first decoding unit decoding the first plane set and a result of the second decoding unit decoding the second plane set.

16. An image decoding apparatus for performing decoding compressed image information, the compressed image information having been obtained by compressing original image data including block image information associating each pixel in a block composed of a plurality of pixels with a luminance value expressed using a natural number k of bits, where k≧2, and the compressed image information having been generated from first region information composed of first segmentation information and first luminance information obtained by performing compression processing according to a predetermined segmentation method on a first plane set composed of at least one consecutive bit plane in the block image information that includes a highest bit plane, and $n^{th}$ region information composed of $n^{th}$ segmentation information and $n^{th}$ luminance information obtained by performing compression processing according to the predetermined segmentation method on a $n^{th}$ plane set composed of at least one consecutive bit plane that is adjacent to the $(n-1)^{th}$ plane set at a lower bit position in the block image information using a result of segmentation for the $(n-1)^{th}$ plane set as a standard, where n is every integer from 2 to a predetermined number that is no greater than k, the image decoding apparatus comprising:

an input unit for receiving an input of compressed image information;

a first region information reading unit for reading the first segmentation information and the first luminance information from the inputted compressed image information;

a first decoding unit for performing segmentation according to the predetermined segmentation method for blocks using the first segmentation information read by the first region information reading unit, and for decoding the first plane set by assigning the first luminance information to segments obtained as a result of the segmentation;

a second region information reading unit for repeating a process reading the $n^{th}$ segmentation information and the $n^{th}$ luminance information from the inputted compressed image information, for each value of n from n=2 to n=the predetermined number;

a second decoding unit for performing segmentation according to the predetermined segmentation method for blocks using the $n^{th}$ segmentation information read by the second region information reading unit with a result of segmentation for the $(n-1)^{th}$ plane set as a standard, and for decoding the $n^{th}$ plane set by assigning the $n^{th}$ luminance information to segments obtained as a result of the segmentation, the second decoding unit decoding every plane, set from n=2 to n=the predetermined number; and a decoded image generation unit for generating decoded image information based on a decoding result of the first decoding unit and decoding results of the second decoding unit.

17. The image decoding apparatus of claim 16, wherein the compressed image information is obtained by performing segmentation according to a quadtree segmentation method, and the first decoding unit and second decoding unit perform segmentation according to the quadtree segmentation method.

18. The image decoding apparatus of claim 16, wherein the compressed image information is obtained having performed segmentation using a division judgement condition whereby an analyzed area is divided if all pixels in the analyzed area do not have a same luminance bit value, and the first decoding unit and second decoding unit use the division judgement condition when performing segmentation.

19. The image decoding apparatus of claim 16, wherein the decoded image generation unit generates first decoded data using a decoding result of the first decoding unit for the first plane set, and the decoded image generation unit generates $n^{th}$ decoded data using a decoding result of the first decoding unit for the first plane set and decoding results of the second decoding unit for the $2^{nd}$ to $n^{th}$ plane sets, for every value of n from n=2 to n=the predetermined number.

20. A computer-readable storage medium for storing an image compression program, the image compression program generating compressed image information by compressing original image data that includes block image information, the block image information associating each pixel in a block composed of a plurality of pixels with a luminance value expressed using a plurality of bits, the program performing compression processing on a first plane set using a first segmentation method, the first plane set being composed of at least one consecutive bit plane in the block image information in the inputted original image data, to generate first region information composed of first segmentation information showing a first segmentation of the block and first luminance information showing luminance bit values that each correspond to a different segment produced by the first segmentation of the block, the program performing compression processing on a second plane set using a second segmentation method, the second plane set being composed of at least one consecutive bit plane that is adjacent to the first plane set at a lower bit position in the block image information, to generate second region information composed of second segmentation information showing a second segmentation of the block and second luminance information showing luminance bit values that each correspond to a different segment produced by the second segmentation of the block, and the program generating and outputting compressed image information based on the first region information and the second region information.

21. A computer-readable storage medium storing an image decoding program for performing decoding compressed image information, the compressed image information having been obtained by compressing original image data including block image information associating each pixel in a block composed of a plurality of pixels with a luminance value expressed using a plurality of bits, and the compressed image information having been generated from first region information composed of first segmentation information and first luminance information obtained by performing compression processing according to a first segmentation method on a first plane set composed of at least one consecutive bit plane in the block image information, and second region information composed of second segmentation information and second luminance information obtained by performing compression processing according to a second segmentation method on a second plane set composed of at least one consecutive bit plane that is adjacent to the first plane set at a lower bit position in the block image information, the program including the following steps:

reading the first segmentation information and the first luminance information from inputted compressed image information;

performing a first segmentation according to the first segmentation method for a block using the read first segmentation information, and decoding the first plane set by assigning the read first luminance information to segments obtained as a result of the first segmentation;

reading the second segmentation information and the second luminance information from the inputted compressed image information;

performing a second segmentation according to the second segmentation method for the block using the read second segmentation information, and decoding the second plane set by assigning the second luminance information to segments obtained as a result of the second segmentation; and generating decoded image information using a decoding result for the first plane set and a decoding result for the second plane set.

* * * * *